US010501058B2

(12) United States Patent
Rancourt et al.

(10) Patent No.: US 10,501,058 B2
(45) Date of Patent: Dec. 10, 2019

(54) WHEEL CHOCK DEVICE

(71) Applicant: IGUANE TECHNOLOGIES INC., Sherbrooke (CA)

(72) Inventors: Denis Rancourt, Sherbrooke (CA); Yves St-Amant, Lévis (CA); Charles Khazoom, Chambly (CA)

(*) Notice: Subject to any disclaimer, the term of this patent is extended or adjusted under 35 U.S.C. 154(b) by 9 days.

(21) Appl. No.: 15/543,846

(22) PCT Filed: Jan. 14, 2016

(86) PCT No.: PCT/CA2016/000013
§ 371 (c)(1),
(2) Date: Jul. 14, 2017

(87) PCT Pub. No.: WO2016/112458
PCT Pub. Date: Jul. 21, 2016

(65) Prior Publication Data
US 2017/0369042 A1  Dec. 28, 2017

Related U.S. Application Data

(60) Provisional application No. 62/103,561, filed on Jan. 14, 2015.

(51) Int. Cl.
*B60T 3/00* (2006.01)
*B60P 3/077* (2006.01)

(52) U.S. Cl.
CPC ............... *B60T 3/00* (2013.01); *B60P 3/077* (2013.01)

(58) Field of Classification Search
CPC ................................... B60T 3/00; B60P 3/077
USPC ......................................................... 188/32, 36
See application file for complete search history.

(56) References Cited

U.S. PATENT DOCUMENTS

| | | | |
|---|---|---|---|
| 1,879,917 A | | 9/1932 | Evans |
| 2,011,469 A | * | 8/1935 | Brueggemann ........... B60T 3/00 188/32 |
| 2,671,533 A | | 3/1954 | Taylor |
| 2,697,494 A | | 12/1954 | Parks |
| 2,720,285 A | | 10/1955 | Taylor |
| 2,723,005 A | * | 11/1955 | Wink ........................ B60T 3/00 188/32 |
| 2,797,774 A | | 7/1957 | Eckhart |
| 2,818,940 A | | 1/1958 | Boyle |
| 2,851,127 A | | 9/1958 | Smith |

(Continued)

*Primary Examiner* — Thomas W Irvin
(74) *Attorney, Agent, or Firm* — PRAXIS

(57) ABSTRACT

A wheel chock (40) has a profile that provides maximum restraining capacity when the wheel (22) is completely supported thereby, by mitigating undesirable failure modes while promoting the safest failure mode of operation, slipping on ground (30). The profile includes a generally flat bottom surface (46) for being in contact with a ground surface (30), a substantially broken top surface (44) for being in contact with the wheel (22), the top surface (44) including a first contact point (P1), a second contact point (P2), and a contact surface (52) there between allowing at most two points of contact at a time between the contact surface (52) and the wheel (22), with the second contact point (P2) being one of the two points of contact. A more specific clothoid profile of the contact surface (52) is preferred to minimize the rate of variation of the contact force of the wheel (22) with the chock (40).

20 Claims, 14 Drawing Sheets

(56) References Cited

U.S. PATENT DOCUMENTS

| | | | | |
|---|---|---|---|---|
| 2,858,906 | A * | 11/1958 | Minick | B60T 3/00 |
| | | | | 188/32 |
| 3,054,477 | A | 9/1962 | Bustin | |
| 3,265,159 | A | 8/1966 | Worden | |
| 3,317,006 | A | 5/1967 | Patterson | |
| 3,664,466 | A | 5/1972 | Rotheiser | |
| 3,734,241 | A * | 5/1973 | Hale | B60T 3/00 |
| | | | | 188/32 |
| 3,858,690 | A * | 1/1975 | Facemire | B60T 3/00 |
| | | | | 188/32 |
| 3,993,167 | A * | 11/1976 | Reed | B60T 3/00 |
| | | | | 188/32 |
| 4,911,270 | A * | 3/1990 | Hudson | B60T 3/00 |
| | | | | 188/32 |
| 6,467,586 | B2 | 10/2002 | Agtuca | |
| 6,957,722 | B1 * | 10/2005 | Baskerville, Sr. | B60T 3/00 |
| | | | | 188/32 |
| 7,000,740 | B2 * | 2/2006 | Chrisco | B60T 3/00 |
| | | | | 188/32 |
| 7,040,461 | B2 * | 5/2006 | Chrisco | B60T 3/00 |
| | | | | 188/32 |
| 9,212,797 | B2 * | 12/2015 | Jeong | B60P 3/077 |
| 2013/0048439 | A1 * | 2/2013 | Marcum | B60P 3/077 |
| | | | | 188/32 |

\* cited by examiner (a)

(b)

WHEEL CHOCK DEVICE

CROSS REFERENCE TO RELATED APPLICATION

Benefit of U.S. Provisional Application for Patent Ser. No. 62/103,561 filed on Jan. 14, 2015, which is incorporated herein by reference, is hereby claimed.

FIELD OF THE INVENTION

The present invention relates to the chock devices, and is more particularly concerned with a wheel chock for use with wheeled or tracked vehicles.

BACKGROUND OF THE INVENTION

Wheel chocks are critical for stabilizing vehicles at rest. Cars, trucks, trailers, motorcycles, tracked vehicles, trains, and aircrafts all benefit from the use of wheel chocks, a low cost and convenient device for vehicle safety. Vehicles at rest may use wheel chocks to maintain a stable position under the action of external force perturbations, including the action of gravity or wind blows. For truck and aircraft applications, it may be expected that wheel chocks also prevent or, at least impede vehicles from moving forward by the action of their engine thrusts or own traction (front wheel drive) and/or propulsion (rear wheel drive). This situation is clearly more demanding in terms of restraining capacity, particularly when the chock is used in less than ideal environmental conditions, including snowy, icy, dirty, oily or soft ground surfaces.

Wheel chocks, along with the ground surface, the tire and the vehicle, form a closed loop mechanism that may become unstable if the chock is not properly designed. Despite the fact that wheel chocks have been used for decades, literature is surprisingly limited in terms of how to make an efficient wheel chock. Using finite element modeling techniques, recent investigators studied the optimal design of a two parallel tubing wheel chock for B737-800 aircrafts. They found that the inferior and superior tubings should be located in such a way to define a plane of contact with the tire that is about 40 to 45 degrees relative to ground. Much earlier, the U.S. Air Force conducted an extensive experimental study on wheel chocks for B-52 and KC-135 aircrafts applications: a standard 5.0 inch aeronautic wheel chock 20 (FIG. 1), a similar design but 6.5-inch high, and an "engine run chock" 20*a* (FIG. 2) were tested. They found that the restraining force to forward movement of the wheel varies nonlinearly with vertical load on the wheel axle. Results showed that the 6.5 inch high wheel chock had a 17% higher restraining capacity while the "engine run chock" showed a restraining capacity superior to other wheel chocks at higher loads, but a lower capacity for smaller loads. Simple statics showed that chock restraining capacity predicted with a ramp model of a standard aeronautic wheel chock 20 (FIG. 3), is closer to experimental results than predictions with a step model 20" (FIG. 4), most likely due to deformations of the combined tire and suspension system.

Although the engine run chock 20*a* demonstrated better retaining capacities, the authors mentioned that it turned into a projectile at one point when the wheel was supported by the chock, thereby indicating the occurrence of a failure mode that may present serious safety issues. Two problems may have led to a failure. Firstly, a projection of the wheel axle point on the ground, through the highest point of the curved surface, extends beyond the chock inferior anterior corner by about 2.5 inches (see dashed-dot line in FIG. 2). This geometry may have led to a failure mode where the chock pivots about its anterior inferior corner on the ground. Secondly, the specific profile selected for the chock has the same curvature as the wheel of the aircraft (see dashed circle representing the tire in FIG. 2), except for a low and short step planar surface that protrudes into the tire as the wheel engages the chock. This design approach may actually induce premature forward slipping of the chock as the wheel may not be completely supported by the chock.

Previous patents (such as U.S. Pat. Nos. 1,879,917, 3,265, 159, 2,797,774, 3,993,167) also suggested that the chock curvature should be fitted to the wheel radius, as does the most accepted SAE J348 norm as well. As a consequence, initial contact with the chock may occur on the highest portion of the chock profile, likely facilitating forward slipping of the chock.

Numerous ornamental design patents relative to wheel chocks exist, but those are not very informative for defining a reliable wheel chock (see U.S. Pat. Nos. 4,911,270, 2,671, 533, 3,054,477, 2,818,940, & 2,851,127 for example). Several patents claim new accessories and new systems, but none provides a clear explanation of how a wheel chock should be designed in terms of material, stiffness, strength, geometric profile, etc. A few patents suggest the use of long base planes (see U.S. Pat. Nos. 2,671,153 & 2,851,127), while others promote the use of chock in a dual configuration for bi-directional stabilization (see U.S. Pat. Nos. 2,697, 494, 2,720,285, 3,317,006, 3,664,466, & 6,467,586). Finally, there exists hundreds of different wheel chocks on the market made out of wood, rubber, urethane, aluminum etc. Unfortunately, manufacturers do not provide detailed specifications regarding their restraining capacities and design. A few standards exist, but they tend to be more specific in the required design without providing details on how to adapt the design to different wheel radii or environmental conditions while preventing common failure modes.

Wheel chocks are simple compliant mechanisms that are critical for stabilizing vehicles at rest. Chocks must be designed with care given the high amount of energy stored during compression by the tire. Despite their importance for vehicle safety, literature is surprisingly limited in terms of what makes a wheel chock more efficient.

Accordingly, there is a need for an improved wheel chock device.

SUMMARY OF THE INVENTION

It is therefore a general object of the present invention to provide an improved wheel chock device that essentially obviates the above-mentioned problems.

An advantage of the present invention is that the wheel chock device, given that chock grounding is not always possible, provides for maximum restraining capacity once the wheel is completely supported by the chock.

Another advantage is that the wheel quickly engages the chock without any possibility of forward slipping of the chock if the minimum ground friction coefficient is known and taken into account in the chock profile definition.

Another advantage of the present invention is that the wheel chock device keeps the rate of variation of the wheel-chock interaction force low while the wheel rolls onto the chock, thereby mitigating possible friction coefficient reduction due to dynamic loading on the chock.

According to an aspect of the present invention there is provided a wheel chock device for stopping a wheel of a vehicle from rolling on a ground surface, said device comprising:
- a profile including a generally flat bottom surface for being in contact with a ground surface and extending between a first end and a second end; and
- a top surface for being in contact with the wheel, the top surface extending over the bottom surface, the top surface having a contact surface being able to support the wheel simultaneously over at most two points of contact thereof;
- the top surface including a first segment adjacent the first end and a second segment extending from the first segment and continuing the first segment away from the first end, the first and second segments defining a contact surface, the first segment being able to support the wheel and forming a generally flat first plane defining a first angle ($\phi_1$) relative to the bottom surface, a tangent of the first angle ($\phi_1$) being equal to or smaller than a minimum static coefficient of friction ($\mu_{min}$) between the bottom surface and the ground surface; and
- the first segment including a first contact point (P1) adjacent the first end and located at a first height ($h_R$) relative to the bottom surface to allow the wheel to engage the chock device, the first height ($h_R$), relative to a radius (r) and the minimum static coefficient of friction ($\mu_{min}$), being obtained from the equation:

$$h_R < r\left(1 - \frac{1}{\sqrt{1+\mu_{min}^2}}\right).$$

In one embodiment, the first segment is able to entirely support the wheel.

Conveniently, the second segment includes a second contact point (P2) being adjacent the second end and at a second height ($h_T$) relative to the bottom surface, the second height ($h_T$) being larger than the first height ($h_R$), the second segment, at the second contact point (P2), defining a tangent having a second angle ($\phi_2$) relative to the bottom surface, a tangent of the second angle ($\phi_2$) being equal to or smaller than a maximum static coefficient of friction ($\mu_{max}$) between the bottom surface and the ground surface.

Conveniently, a projection of the maximum radius of the wheel extending through the second contact point (P2), when the wheel is in contact with the second contact point (P2), intersects the bottom surface adjacent the second end.

Conveniently, the second height ($h_T$), relative to both the radius (r) of the wheel and the maximum static coefficient of friction ($\mu_{max}$), is obtained from the equation:

$$h_T = r\left(1 - \frac{1}{\sqrt{1+\mu_{max}^2}}\right).$$

In one embodiment, a perpendicular projection of the first contact point (P1) on the bottom surface intersects the bottom surface at a first intersection (R) adjacent the first end, wherein the tangent of the second angle ($\phi_2$) intersects the bottom surface at a second intersection (B), and wherein the first segment has a rolling length (AA'), starting at the first point of contact (P1), ensuring the wheel to roll on the first segment and be supported thereon before contacting the second segment;

a minimum distance ($BR_{min}$) between the first and second intersections, relative to the radius (r) of the wheel, the rolling length (AA'), and both the minimum ($\mu_{min}$) and maximum ($\mu_{max}$) static coefficients of friction, is obtained by the equation:

$$BR_{min} = r\left(\frac{\mu_{max}}{\sqrt{1+\mu_{max}^2}} - \frac{\mu_{min}}{\sqrt{1+\mu_{min}^2}} - \frac{1}{\mu_{max}} + \frac{1}{\mu_{max}\sqrt{1+\mu_{max}^2}}\right) + AA'\left(\frac{1}{\sqrt{1+\mu_{min}^2}} - \frac{\mu_{min}}{\mu_{max}}\frac{1}{\sqrt{1+\mu_{min}^2}}\right).$$

In one embodiment, the second height ($h_T$), relative to the radius (r) of the wheel, both the minimum ($\mu_{min}$) and maximum ($\mu_{max}$) static coefficients of friction, and the rolling length (AA'), is obtained from the equation:

$$h_T = r\left(1 - \frac{1}{\sqrt{1+\mu_{max}^2}}\right) + AA'\frac{\mu_{min}}{\sqrt{1+\mu_{min}^2}}.$$

In one embodiment, the rolling length (AA') is larger than 30% of a sustentation length of the wheel, the sustentation length corresponding to a length of a deformed outer perimeter of the wheel being simultaneously in contact with a supporting surface.

Conveniently, the rolling length (AA') is between 40% and 60% of the sustentation length of the wheel.

Conveniently, the rolling length (AA') entirely supports the wheel.

In one embodiment, the top surface includes an anterior portion extending from the second contact point (P2) to the second end, the anterior portion always having a tangent having an angle relative to the bottom surface equal to or less than the second angle ($\phi_2$).

In one embodiment, the contact surface allows either only one point of contact at a time between said contact surface and the wheel or at most two points of contact therebetween with the second contact point (P2) being one of said at most two points of contact.

Conveniently, the second segment including a plurality of flat surface sections connected in an end-to-end relationship relative to one another, each one of the plurality of flat surface sections having a tangent having an angle relative to the bottom surface successively increasing relative to one another from the tangent of the first angle ($\phi_1$) to the tangent of the second angle ($\phi_2$).

Alternatively, the second segment includes a generally concave curved surface having a curvature radius larger than the radius (r) of the wheel.

Conveniently, the concave curved surface has a clothoid or piece-wise clothoids profile starting with a slope equal to the first angle ($\phi_1$) adjacent the first segment and ending with a slope substantially equal to or larger than the second angle ($\phi_2$).

In one embodiment, the bottom surface includes a covering pad mounted thereon for contacting the ground surface.

Conveniently, the covering pad is interchangeable.

In one embodiment, the wheel has a radius varying between a minimum radius ($r_{min}$) and a maximum radius ($r_{max}$), the first height ($h_R$), relative to both a minimum radius ($r_{min}$) and the minimum static coefficient of friction ($\mu_{min}$), being obtained from the equation:

$$h_R < r_{min}\left(1 - \frac{1}{\sqrt{1+\mu_{min}^2}}\right).$$

Conveniently, the minimum distance ($BR_{min}$) between the first and second intersections, relative to both the minimum ($r_{min}$) and maximum ($r_{max}$) radii of the wheel, the rolling length (AA'), and both the minimum ($\mu_{min}$) and maximum ($\mu_{max}$) static coefficients of friction, is obtained by the equation:

$$BR_{min} = r_{max}\left(\frac{\mu_{max}}{\sqrt{1+\mu_{max}^2}} - \frac{\mu_{min}}{\sqrt{1+\mu_{max}^2}} - \frac{1}{\mu_{max}} + \frac{1}{\mu_{max}\sqrt{1+\mu_{max}^2}}\right) +$$
$$AA'\left(\frac{1}{\sqrt{1+\mu_{min}^2}} - \frac{\mu_{min}}{\mu_{max}}\frac{1}{\sqrt{1+\mu_{min}^2}}\right) +$$
$$(r_{max} - r_{min})\left(\frac{1 - 1/\sqrt{1+\mu_{min}^2}}{\mu_{min}}\right).$$

Conveniently, the second predetermined height ($h_T$), relative to the maximum radius ($r_{max}$) of the wheel, both the minimum ($\phi_{min}$) and maximum ($\phi_{max}$) static coefficients of friction, and the rolling length (AA'), is obtained from the equation:

$$h_T = r_{max}\left(1 - \frac{1}{\sqrt{1+\mu_{max}^2}}\right) + AA'\frac{\mu_{min}}{\sqrt{1+\mu_{min}^2}}.$$

In one embodiment, the wheel has a radius varying between a minimum radius ($r_{min}$) and a maximum radius ($r_{max}$), the second height ($h_T$), relative to both a maximum radius ($r_{max}$) of the wheel and the maximum static coefficient of friction ($\mu_{max}$), being obtained from the equation:

$$h_T = r_{max}\left(1 - \frac{1}{\sqrt{1+\mu_{max}^2}}\right).$$

In one embodiment, the second segment is a slippery surface having a coefficient of friction with the wheel equal to or smaller than 0.5.

Conveniently, the connecting member is a pin device transversally and releasably extending the slippery surface includes a plurality of rollers freely rotatably mounted onto the chock device and being in parallel relationship relative to one another.

According to another aspect of the present invention there is provided a kit for stopping a wheel of a vehicle from rolling on a ground surface, said kit including at least two wheel chock devices as above-defined, a first one of the at least two wheel chock devices being mountable in front of the wheel and a second one of the at least two wheel chock devices being mountable on the rear of the wheel, the first and second wheel chock devices entirely supporting the wheel.

In one embodiment, the first and second wheel chock devices are releasably connected to one another with a connecting member.

Conveniently, the connecting member is a pin device transversally and releasably extending at least partially into at least one through bore extending into each one of the first and second wheel chock devices.

In one embodiment, the first and second wheel chock devices at least partially extend into one another.

Other objects and advantages of the present invention will become apparent from a careful reading of the detailed description provided herein, with appropriate reference to the accompanying drawings.

BRIEF DESCRIPTION OF THE DRAWINGS

Further aspects and advantages of the present invention will become better understood with reference to the description in association with the following Figures, in which similar references used in different Figures denote similar components, wherein.

Figure 11:
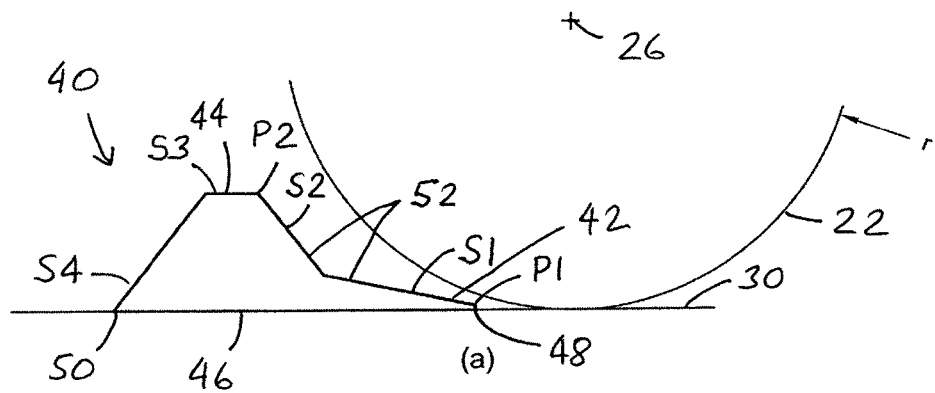
FIG. 11 is an elevation view of a wheel chock device in accordance with an embodiment of the present invention, showing the wheel chock device from a quasi-static standpoint, with different positions of the wheel relative to the device, with (a) wheel rolling toward the chock; (b) wheel initiating contact on first surface segment S1 at point P1; (c) height $h_R$ of initial contact point P1 for minimum wheel radius $r_{min}$; (d) initial contact at point P2 on second surface segment S2, following rolling on first surface segment S1.
Figure 11:
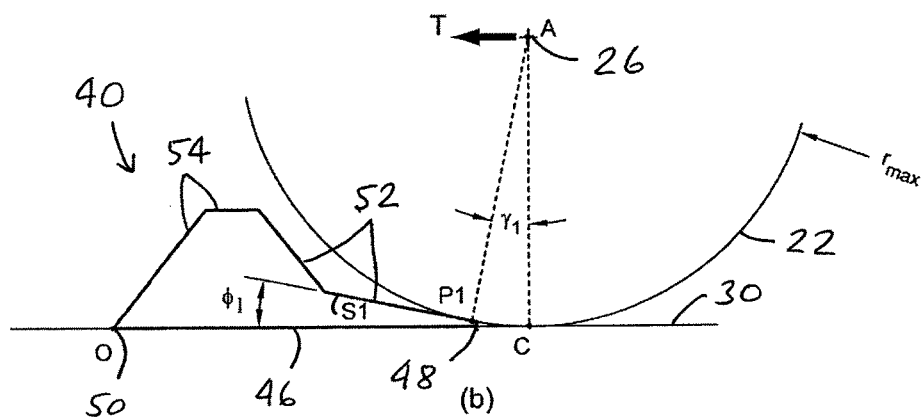
Figure 11:
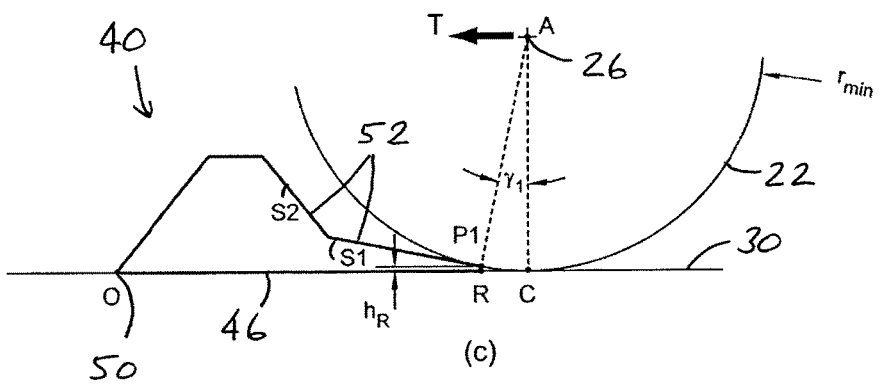
Figure 11:
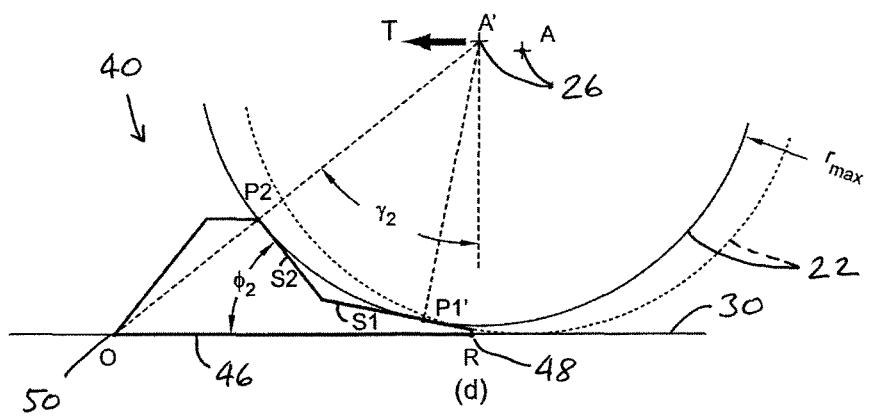
Figure 11:
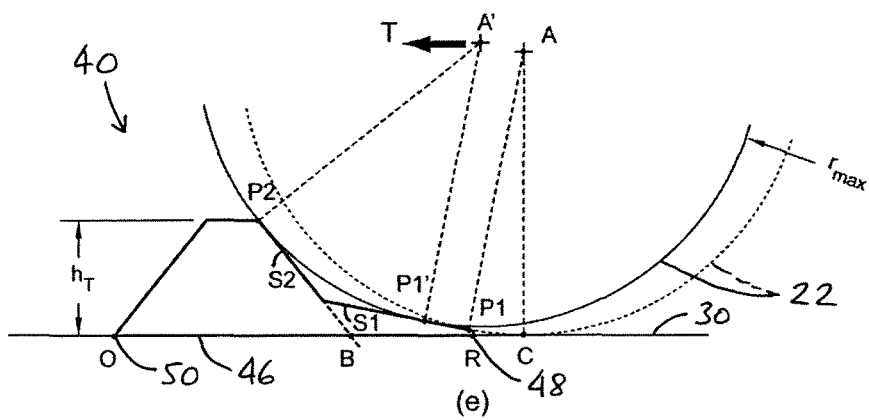
Figure 11:
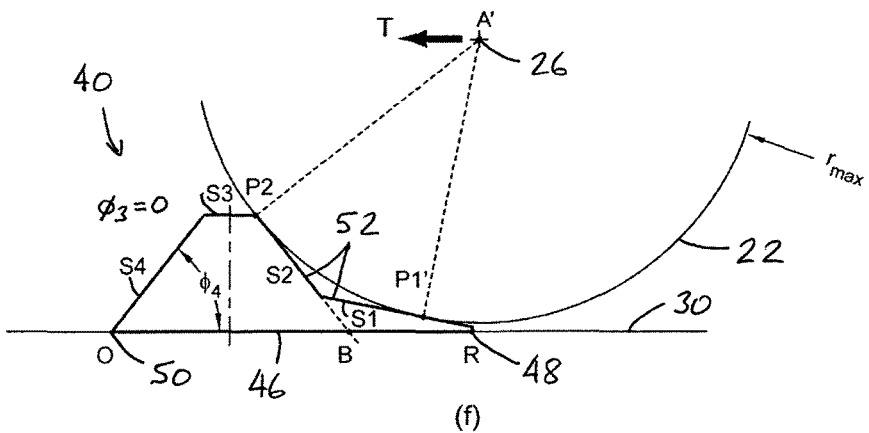
Figure 12:
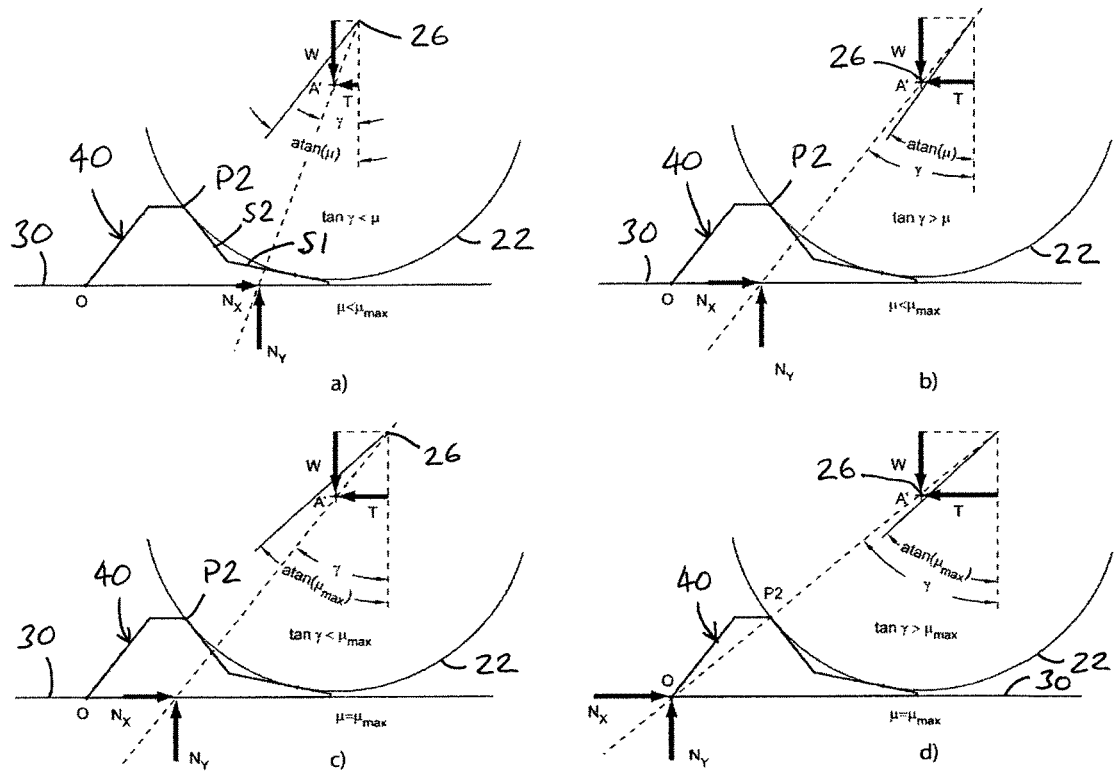
Figure 13:
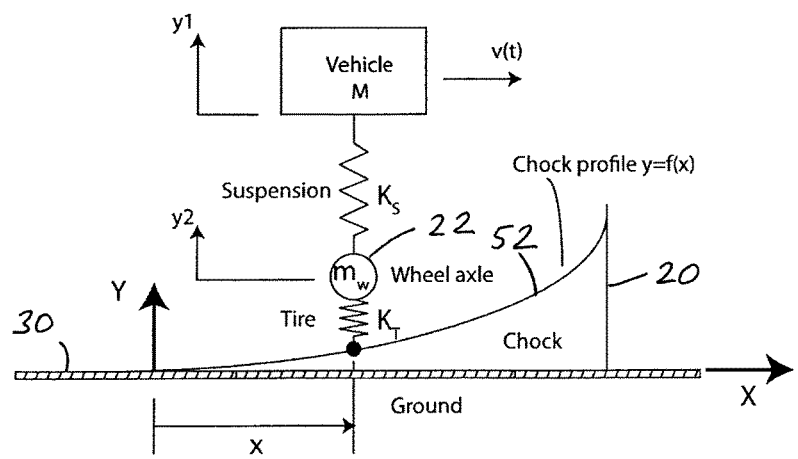
Figure 14:
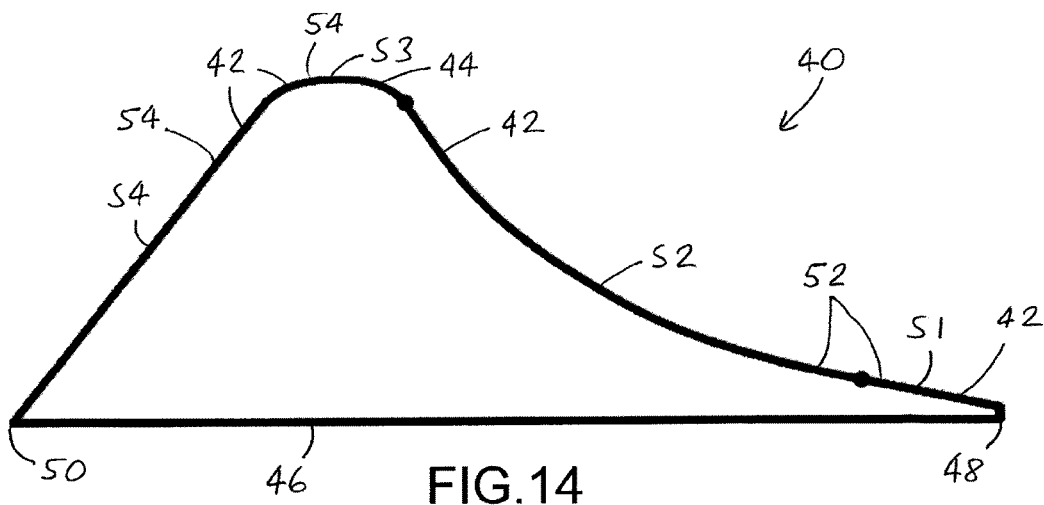
Figure 15:
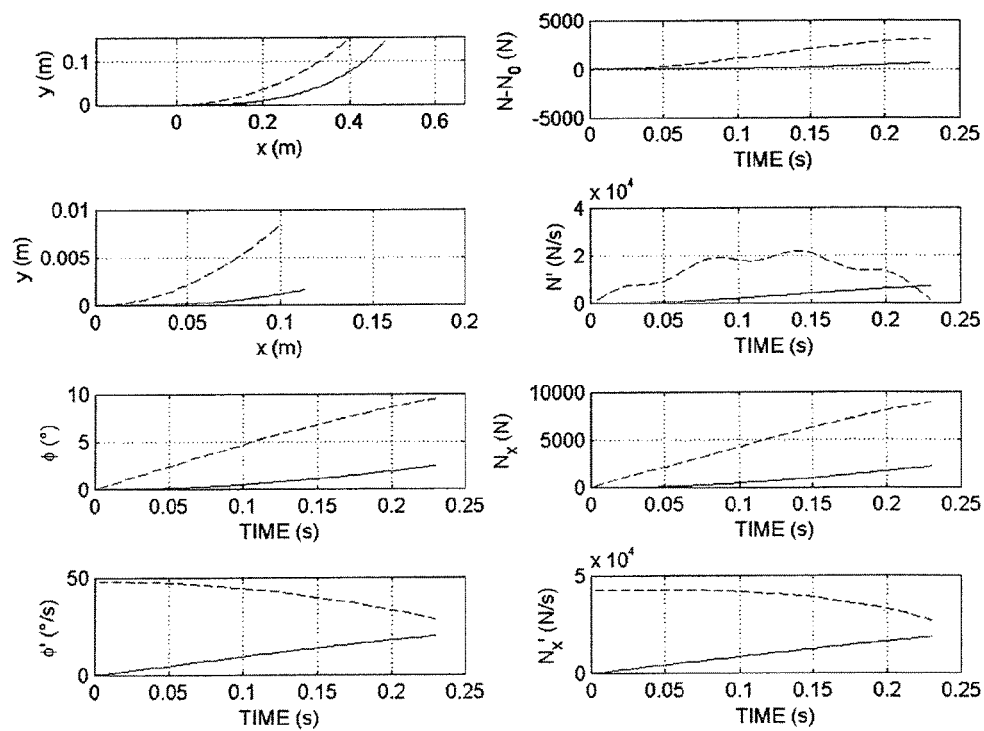
Figure 16:
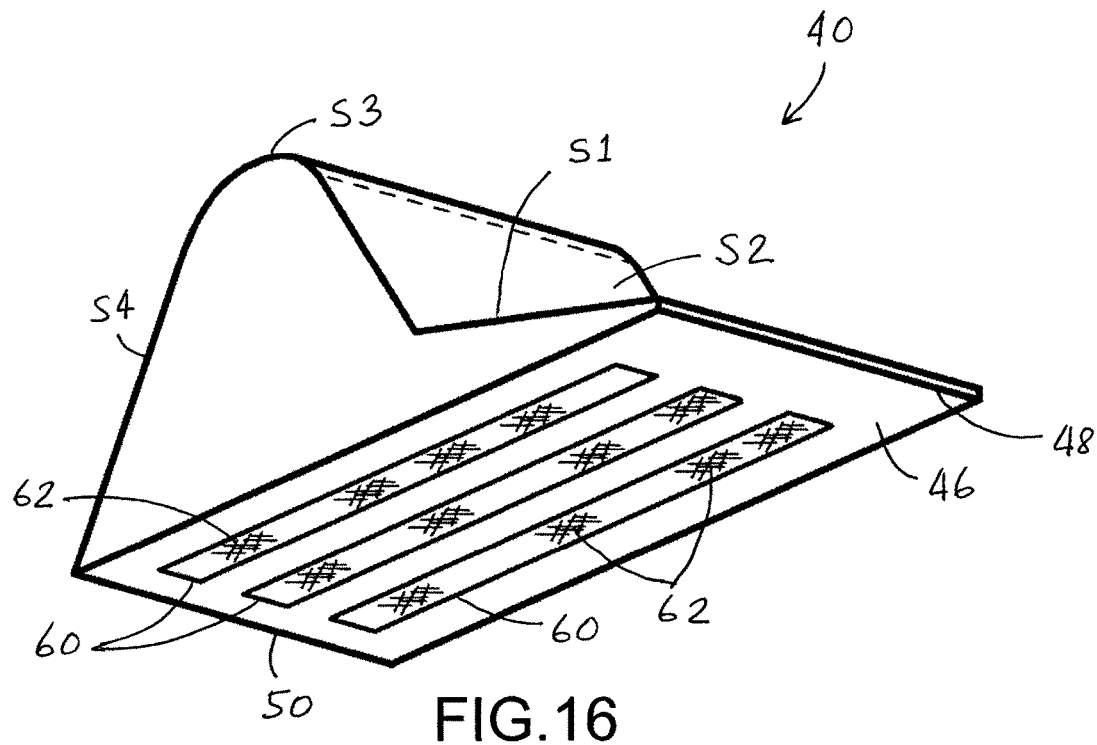
Figure 17:
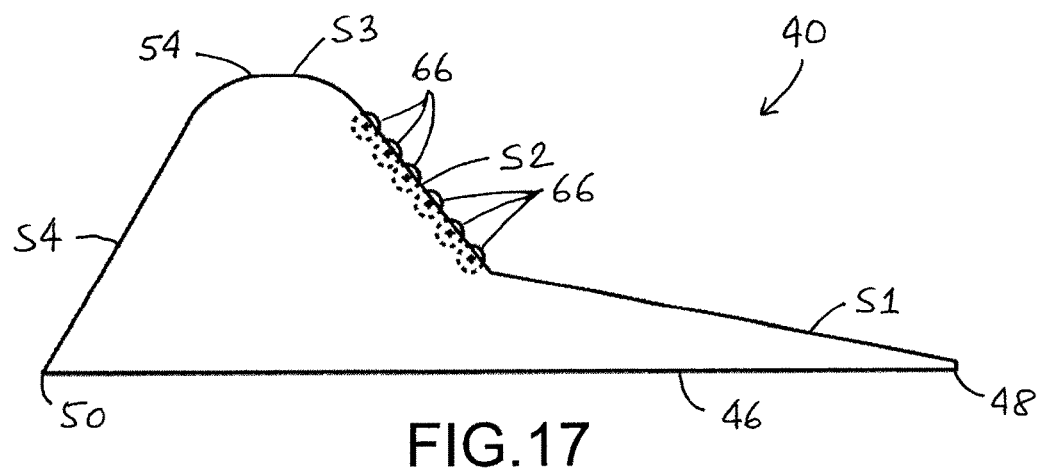
Figure 18:
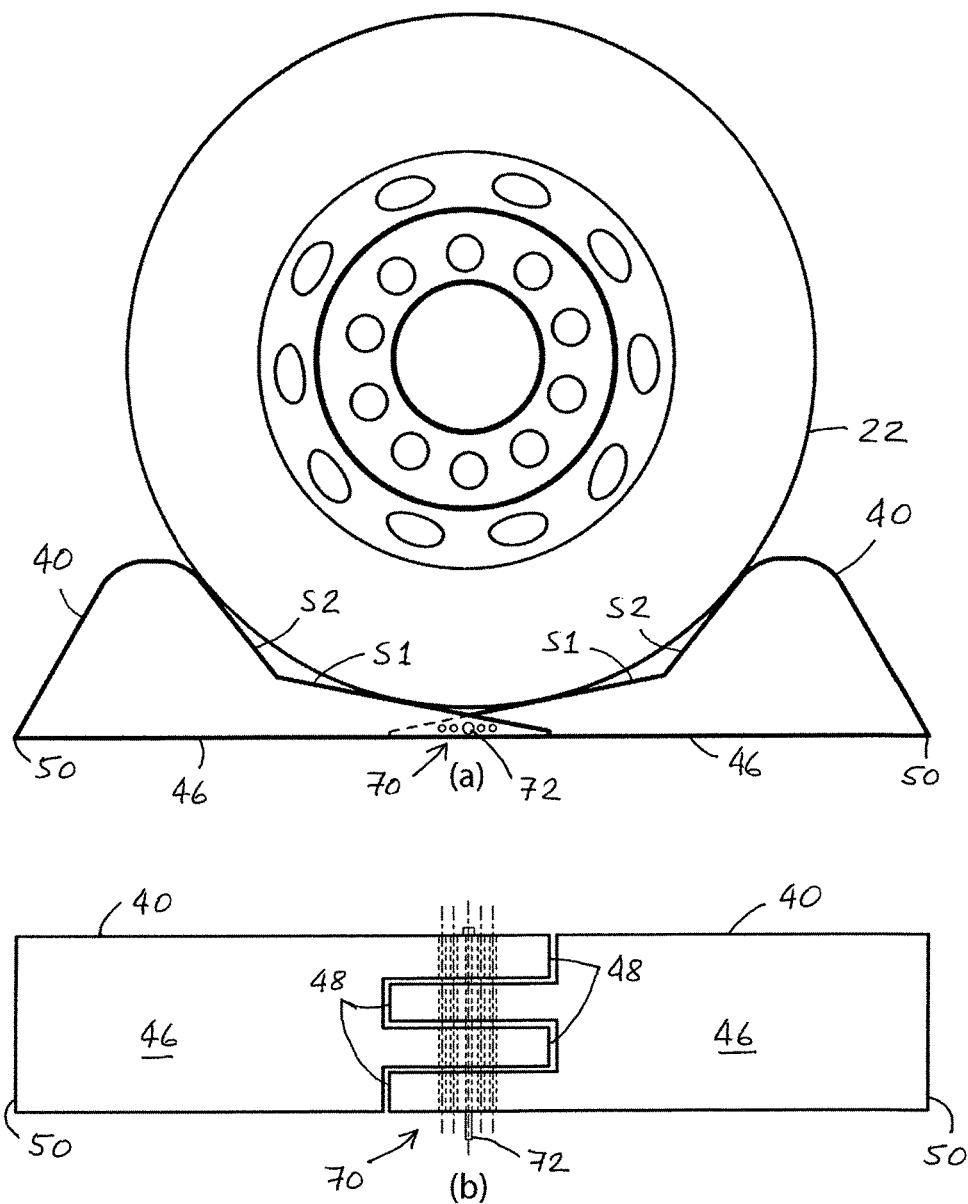

(e) definition of segment BR and overall chock height based on point P2 location; and (f) tilted anterior portion of the chock to prevent failure mode F during roll-over;

FIG. 12 is an elevation view of the embodiment of FIG. 11, showing a free body diagram of the wheel chock along with the wheel, with a) a graph with $\mu<\mu_{max}$, tan $\gamma<\mu$ such that the chock does not fail under mode B; b) a graph with $\mu<\mu_{max}$, tan $\gamma>\mu$ such that the chock fails under mode B; c) a graph with $\mu=\mu_{max}$, tan $\gamma<\mu_{max}$ such that the chock does not fail under mode B; and d) a graph with $\mu=\mu_{max}$, tan $\gamma>\mu_{max}$ such that the chock fails under mode B;

FIG. 13 is a schematic diagram showing the vehicle suspension-wheel-chock simplified model for simulating dynamic interacting forces with the chock;

FIG. 14 is an elevation view of a wheel chock device in accordance with another embodiment of the present invention, showing a concave curved second segment of the contact surface and a curved third surface;

FIG. 15 is a schematic graphical representation showing dynamic response of circular and clothoid chock profiles of embodiments of the present invention, assuming a horizontal first segment, with top left graph being the overall chock profile; second top left graph being the mass trajectory versus time; third top left graph being orientation of the wheel-chock contact force versus time; bottom left graph being the rate of change in the orientation of wheel-chock contact force versus time; top right graph being the wheel-chock contact force magnitude versus time relative to contact force prior to engaging the chock; second top right graph being the rate of change of wheel-chock contact force magnitude versus time; third top right graph being the horizontal wheel-chock contact force magnitude versus time; and bottom right graph being the rate of change in the horizontal wheel-chock contact force magnitude versus time;

FIG. 16 is a bottom rear perspective view of a wheel chock device in accordance with another embodiment of the present invention, showing a planar second segment of the contact surface and a curved third surface, along with a plurality of covering pads mounted onto the bottom surface;

FIG. 17 is an elevation view of a wheel chock device in accordance with another embodiment of the present invention, showing a second segment of the contact surface formed with a plurality of free rolling rollers; and FIG. 18 is a left side elevation view and a bottom view of a kit of two wheel chock devices in accordance with another embodiment of the present invention, showing the wheel chock devices, securing and supporting a wheel, partially engaging one another and being releasably secured to one another via a connecting pin device.

DETAILED DESCRIPTION OF THE INVENTION

With reference to the annexed drawings the preferred embodiment 40 of the present invention will be herein described for indicative purpose and by no means as of limitation.

The present invention proposes a non-exhaustive list of design criteria of a wheel chock 20 to maximize its restraining capacity while preventing most of its potential failure modes. It is shown that by a precise definition of its geometric profile, most failure modes can be avoided, assuming that the profile remains practically constant under load. A static analysis of the wheel chock is first presented to identify the mechanical function of a wheel chock and to predict its restraining capacity. An energy approach further clarifies the impact of vehicle speed and chock's geometric profile on its performance. Given the operating conditions of a wheel chock, a detailed description of its possible failure modes follows and a standard aeronautic chock is used to explain how to mitigate most of them by a clever design of its geometric profile. Design features are then listed to adapt the profile to various tire dimensions and ground friction coefficients, in order to take full advantage of the ground friction properties when the chock is not anchored on ground. Dynamic simulations finally demonstrate that a chock with a clothoid profile seems preferable to improve chock's efficiency under dynamic loading conditions when the vehicle has an initial velocity when engaging the chock surface.

Restraining Capacity of a Chock

Published work in the literature assumes that wheel chocks are grounded. As a first approximation, this assumption is also used in the current analysis. The assumption will be further relaxed. The U.S. Air Force proposed two simplified static models of a wheel chock 20 for predicting its restraining capacity. The first model, the ramp model 20' shown in FIG. 3, assumes that the wheel 22 makes a tangential contact with a chock's planar surface 24. Upon forward movement of the vehicle (not shown), the wheel axle 26 trajectory hence follows a ramp trajectory and the contact force N with the chock 20' is at an angle $\gamma$ from the vertical, equal to the ramp inclination $\phi$. Using a free body diagram of the wheel 22 in contact with the chock 20' and assuming static equilibrium, summation of moments about contact point P gives an expression for the quasi-static horizontal force T exerted on the axle 26, to compensate for a given vertical axle load W:

$$T = W \tan \phi, \tag{1}$$

where $\phi$ is the axle trajectory inclination relative to ground surface 30. The model assumes no rolling resistance, no braking action and no chock slipping on the ground surface 30. The wheel chock's restraining capacity is therefore dependent on the wheel axle trajectory inclination, determined by the chock's contact plane orientation. Vertical load W is also involved in many situations, but not when traction force T is proportional to load W, such as a pull from gravity, when the vehicle is maintained at rest on a tilted ground surface.

Figure 3:
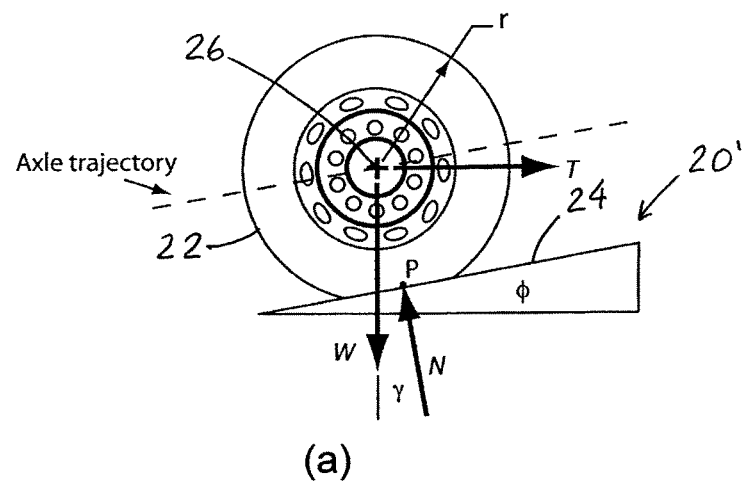
FIG. 3 is a schematic elevation view of a static ramp model for simulating contact of a wheel with the standard aeronautic chock of FIG. 1, in which the ramp inclination is estimated by computing the slope of segment CP if first contact with the chock is not made with the 45-degree chock surface.
Figure 3:
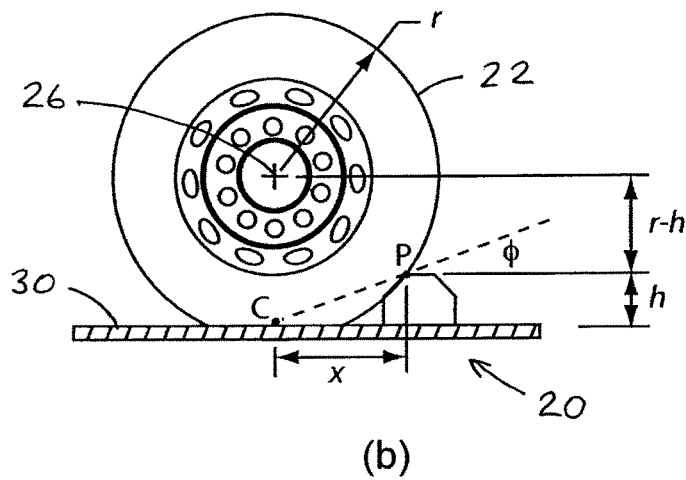

The ramp model may also be used to evaluate the restraining capacity of a standard aeronautic chock 20 when a wheel 22 makes a point contact with the chock 20, instead of a planar contact. Given the geometric profile of the chock 20 and wheel radius r, first contact with the chock 20 occurs at point P located at a height h from the ground surface 30, and at a horizontal distance x from the ground contact point C, as shown in FIG. 3. Considering tire deformation upon rolling on the chock 20, one may hence estimate an effective angle $\phi$ by computing the slope of the line connecting point C to point P. Based on simple geometric calculation, one can show that the ramp inclination is thus given by:

$$\phi = \tan^{-1}\left[\frac{h}{\sqrt{h(2r-h)}}\right] \tag{2}$$

The ramp/point contact model indicates that chock's restraining capacity is dependent on the height of the first contact point P and the radius of the wheel 22 in contact with the chock 20. In other words, chock capacity is intimately related to the chock geometrical profile.

Figure 4:
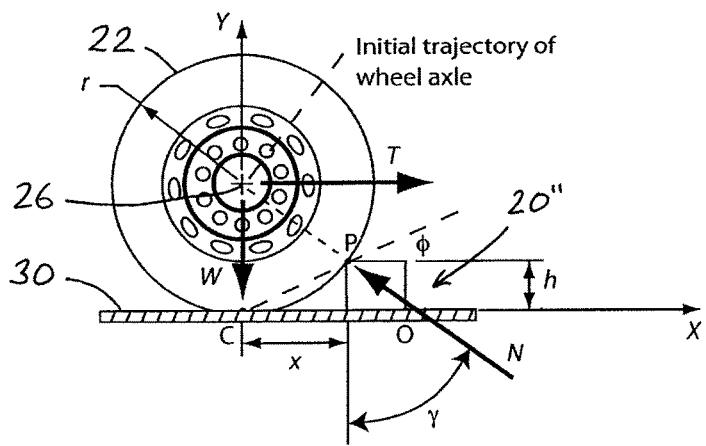
FIG. 4 is a schematic elevation view of a static step model for simulating contact of a wheel with a chock at a contact point P.

The previous analysis assumed that ramp inclination remains constant with wheel motion. This assumption is often not met in practice since deformations usually occur at the ground surface 30, at the chock 20 and at the tire surface upon contact. The more deformation there is, the less inclination of the ramp, and the less is the chock restraining capacity. Determination of the exact system deformation involved while the wheel 22 rolls on a non-ramp like chock requires advanced hyperelastic non-linear modelling techniques. The maximum theoretical restraining capacity of a chock can be easily obtained, however, by assuming infinite mechanical impedance of the ground surface 30, the chock 20 and the tire. Let's assume then, a step contact model between the chock 20" and the wheel 22, as shown in FIG. 4, except now that the wheel 22 is not making contact with point C on the ground surface and there is no braking action. A moment balance of the wheel 22 about contact point P indicates that the maximum traction force T that can be exerted on the axle 26 while keeping the wheel 22 at rest is given by:

$$T_{max} = \frac{Wx}{r-h} \quad (3)$$

Similarly, a moment balance of the wheel 22 about the axle 26 indicates that contact force N is directed along a line that connects point P to the axle. Notice that the orientation of contact force N (i.e. angle γ) is, in general, no more equal to the angle ϕ. Replacing value of x in Eq. (3) leads to a maximum restraining capacity given by:

$$T_{max} = \frac{W\sqrt{h(2r-h)}}{r-h} \quad (4)$$

Again, results show a chock's restraining capacity dependent on chock's geometrical profile and, as well, on wheel radius. When the chock 20" is used on tilted ground surfaces, the gravity pull on the vehicle is proportional to W such that chock's restraining capacity becomes independent of vehicle weight. When the chock 20" is used on a level ground surface 30 to resist self-propulsion of the vehicle or external force perturbations such as wind blows, then weight W now influences chock's restraining capacity.

Figure 5:
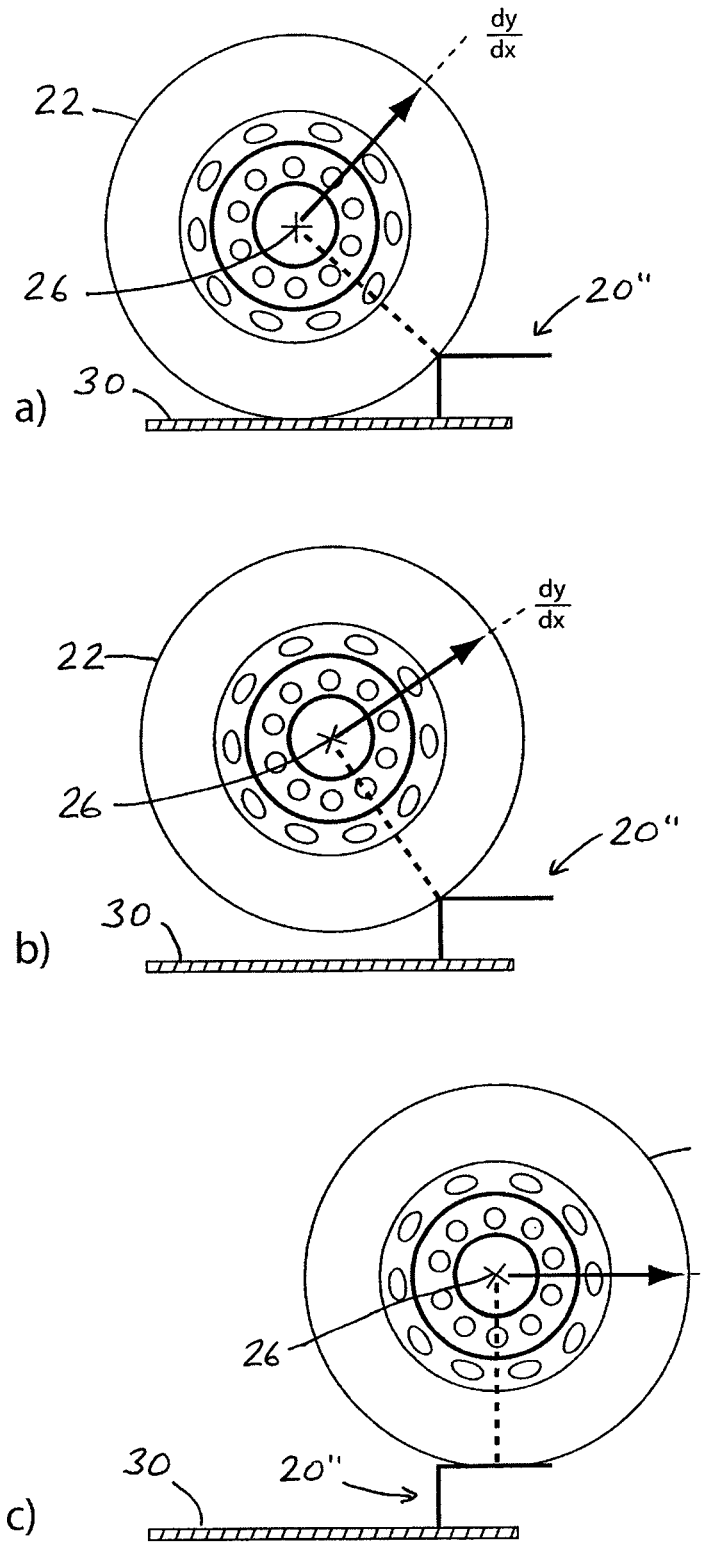
FIG. 5 is a schematic illustration of a variable slope of the axle trajectory of a wheel as a function of the wheel rotation about the top corner of a chock.

A work-energy analysis of the wheel 22 in contact with the chock 20" brings further insights into how a chock performs as the wheel moves forward over the chock. In practice, for a single axle vehicle rear suspension, when the wheel 22 rolls over the chock surface, the axle 26 follows a given trajectory y(x), where variable y is the axle height. When traction force T is statically exerted on the axle 26, a forward movement is prevented if the work performed by force T is smaller than the variation of potential energy stored in the vehicle-suspension-wheel-chock closed-loop mechanism system, for a given virtual infinitesimal motion dx of the axle 26, assuming no energy loss in the mechanism. This requirement for chock's performance can be expressed as:

$$T_{max} = \frac{dV(x,y)}{dx} \quad (5)$$

where V(x,y) is the potential energy field of the closed-loop mechanism. For a single-axle rear suspension vehicle, and assuming quasi-static conditions, the suspension spring length remains practically constant and the energy field can be approximated by:

$$V(x,y) \cong V(y) = mgy, \quad (6)$$

where m is half of the apparent mass on the wheel rear axle. Hence, the constraint expressed by Eq. (5) becomes:

$$T_{max} = \frac{dV(x,y)}{dx} = \frac{dV(x,y)}{dy}\frac{dy}{dx} = mg\frac{dy}{dx}, \quad (7)$$

which is equivalent to Eq. (1), for a ramp contact situation. For the step contact model 20", the slope of the trajectory depends on the rotation angle of the wheel 22 about contact point P, as illustrated in FIG. 5. The restraining capacity of the chock 20" is maximal when the wheel 22 is just loosing contact with ground 30, as the slope trajectory is maximal, and it progressively reduces down to zero when it reaches the chock's top surface. Obviously, a better chock's restraining capacity is obtained when the axle trajectory has a higher slope, assuming that the chock 20" is grounded. Consequently, as one may expect, any deformation of the ground surface 30, the chock 20" or the tire during chock rolling-over decreases the chock's restraining capacity to forward motion by decreasing the axle trajectory slope. This energy analysis of chock's capacity is also instructive to figure out the impact of an initial velocity of a vehicle making contact with a step-like chock 20". If the vehicle is not initially at rest before making contact with the chock 20", its kinetic energy will bring the axle 26 upward, where the restraining capacity is smaller because of a reduced axle trajectory slope. A non-zero vehicle velocity may therefore be detrimental to chock's restraining capacity.

If the vehicle has multiple axles at the rear, the restraining capacity depends on the suspension design that determines potential field V(x,y) and how it varies for an infinitesimal displacement dx. Essentially, if the suspension does not distribute the load equally over the axles, the potential field deviates from the previous analysis depending on how much load is transferred from one axle to the other when the wheel rolls over the chock.

Evidently, Eq. (1) indicates that a vertical chock surface, with a height larger or equal to the wheel radius, is the optimal chock from a restraining capacity standpoint. This is only true if the chock anchoring system is strong enough to sustain the vehicle external force perturbations. Commercial systems exist to implement a "vertical" chock surface, but their price is much higher than many other chock systems that rely on ground friction to stabilize them, and they are most often not moveable. The latter chock design, however, may suffer from a number of failure modes that are described below, if the chock is not properly designed.

Failures Modes of a Wheel Chock

Figure 6:
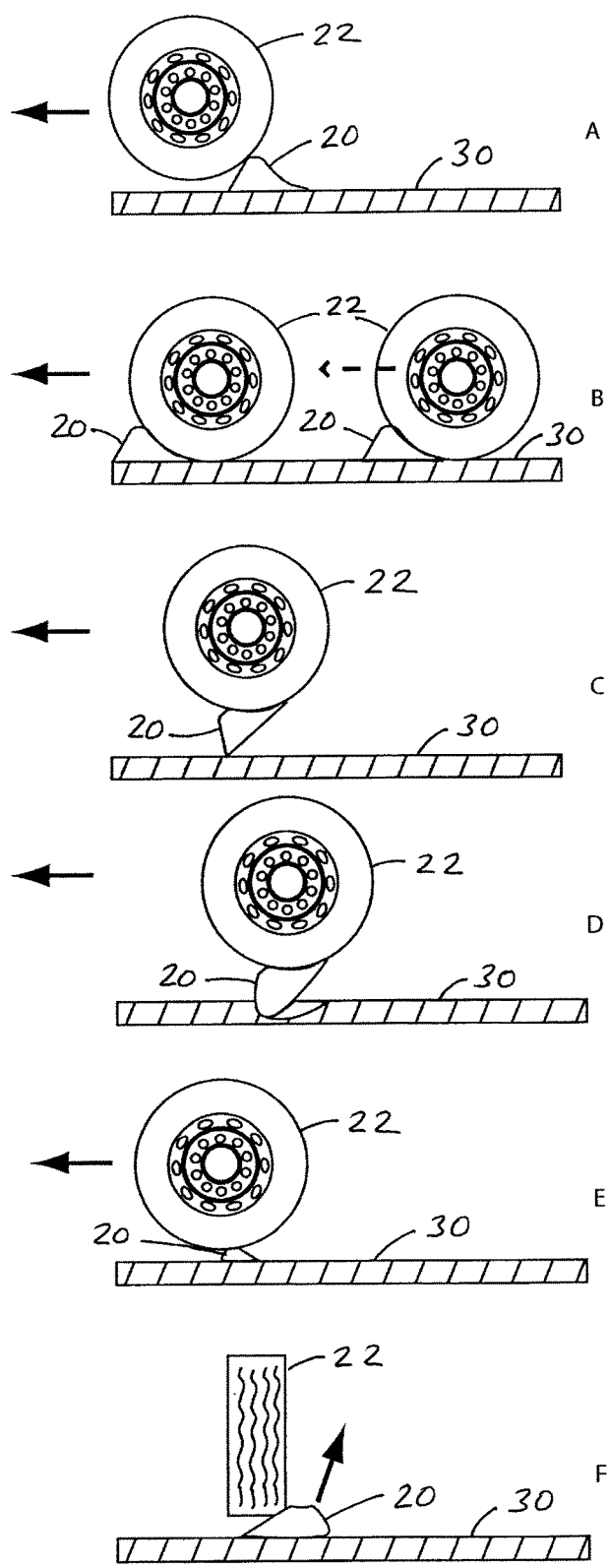
FIG. 6 is a schematic illustration of various failure modes of a wheel chock in side (A-E) and front (F) elevation views, with A a wheel rolling over the chock; B a chock slipping on ground; C a pivoting about inferior anterior edge of the chock; D a chock grooving supporting surface; E a vertical compression of chock; and F an expulsion of chock.

The previous static models assumed that the wheel chock 20 was grounded. This condition is often not met in practice because chocks 20 often rely on ground-chock interface friction properties to maintain their stability. Hence, several failure modes may occur, as illustrated in FIG. 6. These are described in the prior art and further observed experimentally where a number of chocks were tested on a trailer pulled-off by a tractor attempting to move forward, starting with a zero velocity. Each mode is described below.

Mode A: Rolling-Over

Figure 1:
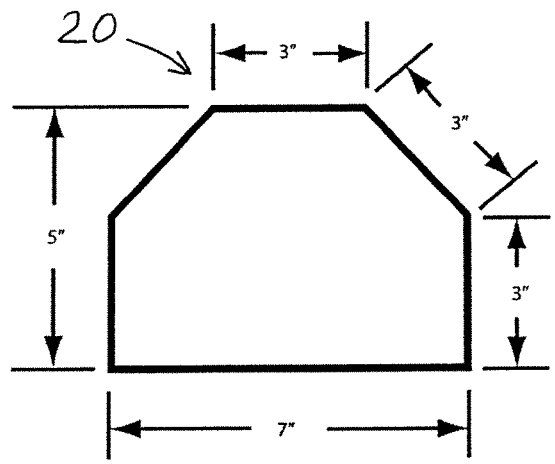
FIG. 1 is a profile view of an example of a 5-inch standard aeronautic wheel chock of the prior art.

Mode A occurs when the wheel 22 rolls over the chock 20 due to a sufficient traction force $T_{max}$ given by Eq. (1) or more generally, Eq. (5). For instance, for the standard aeronautic chock 20 illustrated in FIG. 1, if the wheel 22 makes an initial contact on the 45-degree planar surface, the traction force must be smaller than the load on the axle to prevent rolling over the chock. Similarly, the SAE standard J348 [20] suggests a wheel-chock contact plane with an angle ϕ within 35 to 45 degrees. Such inclination is sufficient to stabilize a vehicle in many situations of tilted ground surfaces. However, it may not be sufficient to prevent the vehicle from moving forward by its own propulsion. For instance, when a trailer is immobilized at a docking station, the tractor has sufficient power to leave the station by rolling over the chock. As a matter of fact, a tractor has sufficient power to pull a trailer that has a locked wheel that slips on the ground 30.

If traction force T is large enough, failure mode A i.e. rolling-over the chock may occur, assuming that the chock's anchor points on ground have enough resistance both horizontally and vertically. From a safety standpoint, it is advisable to prevent failure mode A since vehicle resistance to forward motion disappears once the wheel rolls over the chock.

Mode B: Slipping on Ground

Figure 7:
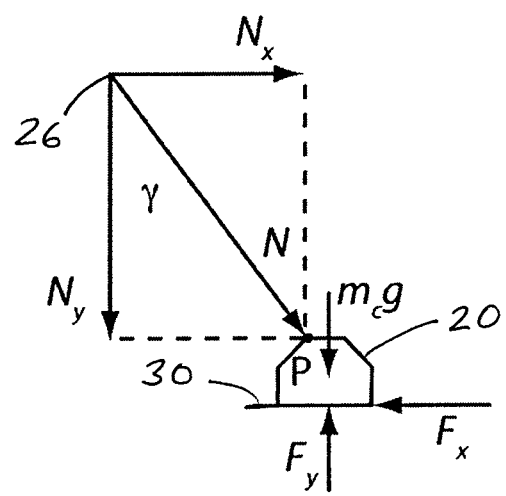
FIG. 7 is a schematic diagram showing a free body diagram of a standard aeronautic wheel chock once the wheel axle load is completely transferred to the chock.

Many chock designs rely on ground friction to stabilize them on the ground surface 30. Referring to FIG. 7 and considering equilibrium in the horizontal direction, the chock 20 does not slip on the ground if the following condition is met:

$$N_x \leq \mu(m_c g + N_y), \quad (8)$$

where $m_c$ is the chock's mass and $N_x/N_y = \tan \gamma$. An ideal chock 20 should ensure that this condition is met, at least until the wheel 22 is completely supported by the chock 20 to take advantage of its maximum restraining capacity. Regarding this constraint, the actual chock design challenge is to fulfill Eq. (8) at all time when the wheel progressively transfers its weight from the ground surface at point C, to the chock. Indeed, if a wheel initially contacts a chock at a point P, unless material properties of the system are well known and that advanced models are available, orientation of contact force N is not precisely known and, as such, components $N_x$ and $N_y$. Therefore, it is unclear whether constraint Eq. (8) is met during load transfer from point C to point P. One way to get around this problem is to ensure that a planar contact is made with the wheel at initial contact. In other words, the chock surface must be tangent to the wheel at contact. By ensuring a given slope on the contact surface, orientation of contact force N is well controlled and may be tuned such as to fulfill Eq. (8).

Figure 8:
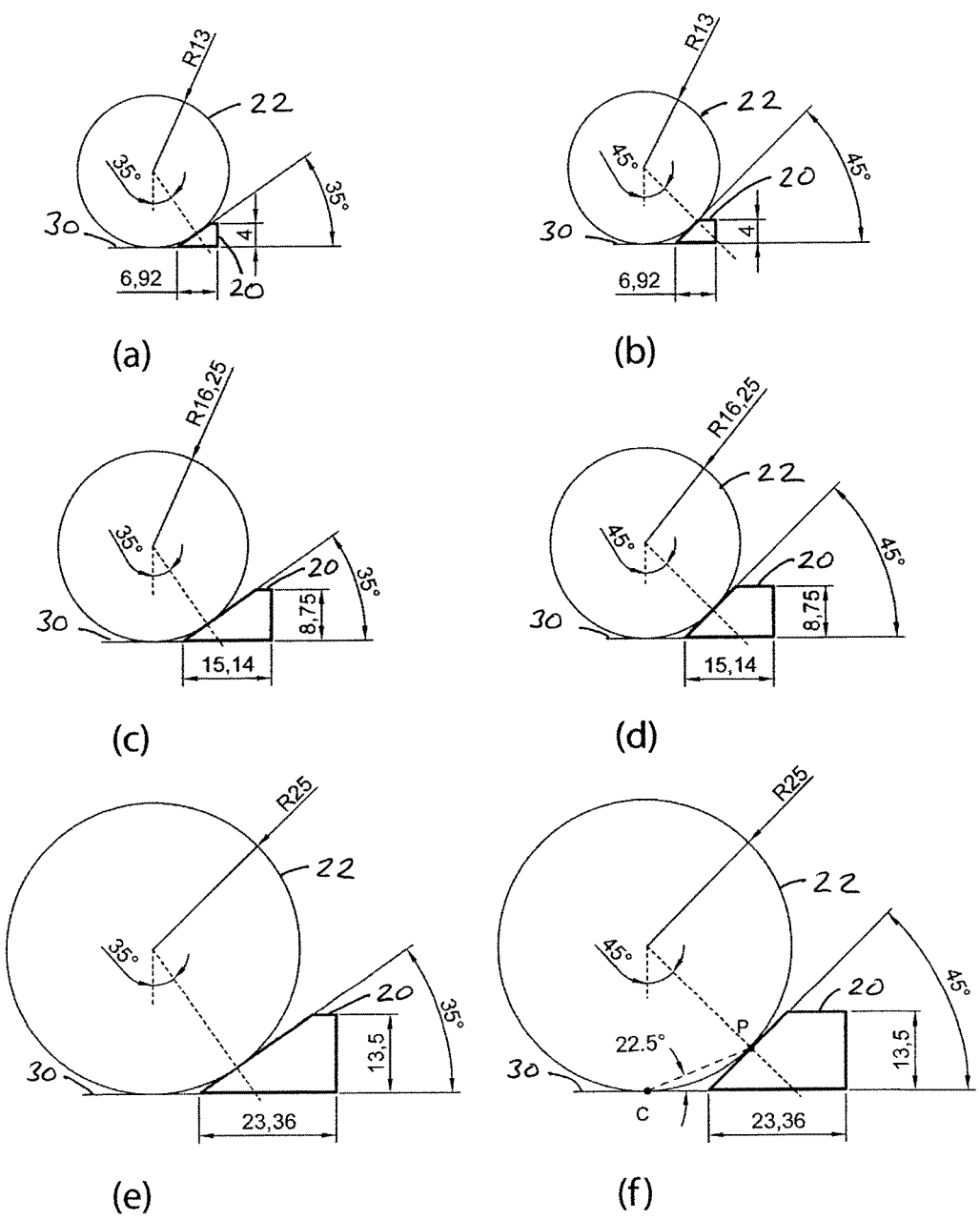
FIG. 8 is a schematic illustration of different chock profiles a)-f) based on suggestions from the SAE J348 standard, assuming tangent planar contact with the chock, for various combinations of wheel radii and chock height.
Figure 9:
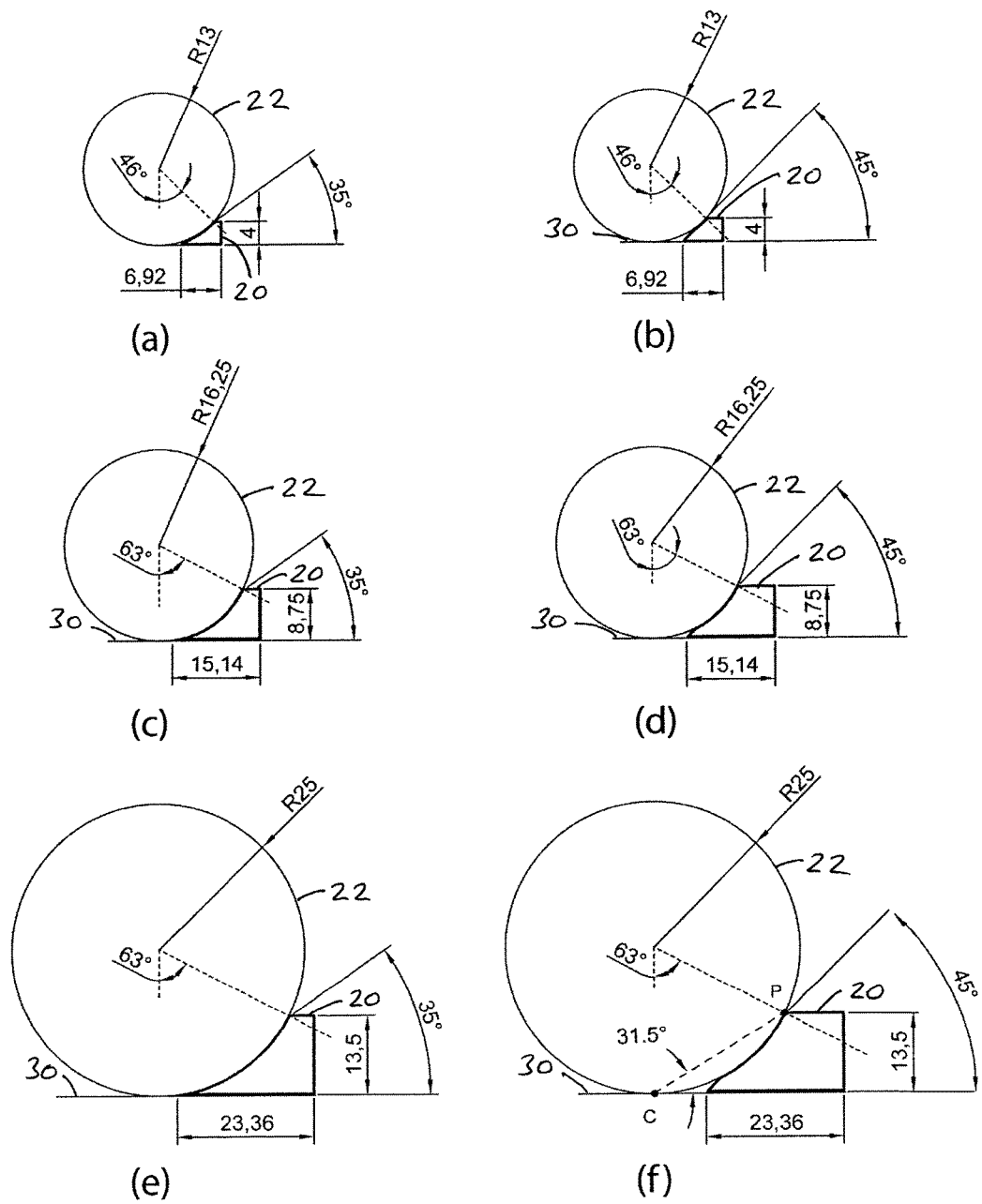
FIG. 9 is a schematic illustration of different chock profiles a)-f) based on suggestions from the SAE J348 standard, assuming point contact with the chock at superior edge, for various combinations of wheel radii and chock height.

In this regard, the SAE standard J348 [20] provides a limit to chock's height for a given wheel radius, while maintaining an overall chock surface of 35 to 45 degrees. Unfortunately, the standard does not indicate any reference to figure out the origin of their data. Hence, data from the graph provided in the standard were extracted to simulate the resulting chock's geometry for a number of wheel radii and chock overall angles of 35 and 45 degrees. Simulations are shown in FIG. 8 for a planar tangent contact with the chock 20. Both for the 35 or 45 degrees overall chock angle, tangent contact ensures stability of the chock 20 for ground friction coefficients of respectively 0.7 and 1.0. If the ground friction coefficient is lower, the chock 20 undergoes failure mode B soon after contact is made with the chock surface. FIG. 9 illustrates the contact situation for a chock 20 with a point contact at the superior edge, still fulfilling requirements from the SAE standard. For the various wheel radii, the chocks face identical concerns. Firstly, if the line of action of the contact force N with point P connects the axle to point P, it passes anterior to point O, thereby allowing for failure mode C. Secondly, the worst case scenario for the line of action is most likely at an angle γ that varies between 46 to 63 degrees, i.e. requiring friction coefficients of respectively 1.03 and 1.96 to avoid failure mode B. These values are significantly over the friction properties of many ground surfaces. However, the actual line of action of contact force N is not known a priori. The interaction between the wheel 22 and the chock 20 could be such that angle γ is much lower.

Figure 10:
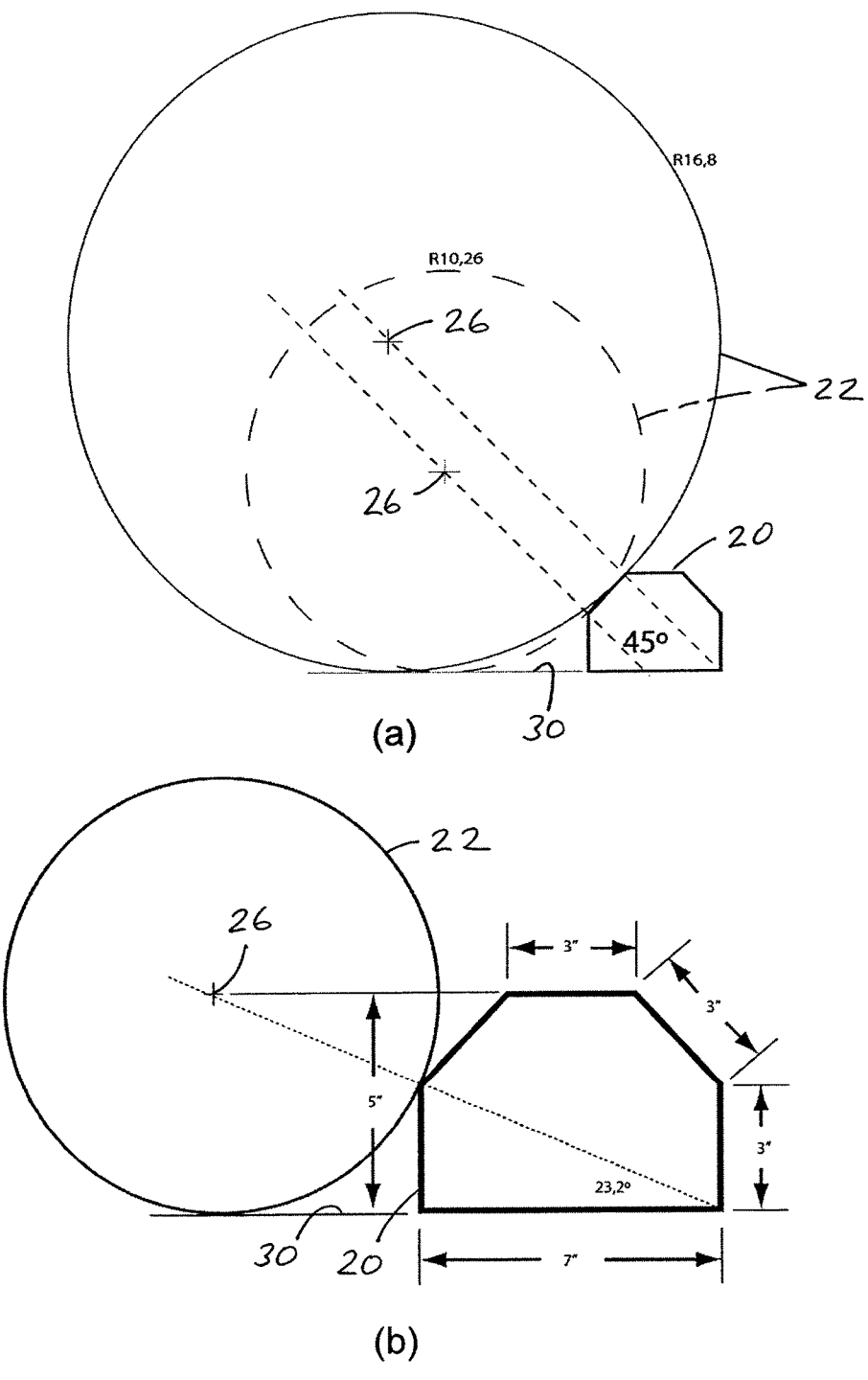
FIG. 10 is a schematic elevation view illustration of a contact geometry of various wheel sizes on a 5-inch standard aeronautic chock of FIG. 1, showing at the top, a minimum wheel radius of 10.26 inches to obtain a 45-degree contact angle (broken line circle) and wheel radius of 16.8 inches beyond which contact angle decreases from 45 degrees (solid line circle), and at the bottom, a minimum wheel radius of 5 inches to obtain a 23.2-degree contact angle.

The standard aeronautic chock 20 is particularly of interest with regards to the control of contact force orientation with the chock. Assuming infinite stiffness of the wheel 22 and shock 20 and no friction at the contact point P, geometric simulations made show that a minimum wheel radius of 16.8 inches is required before the wheel 22 makes an initial contact with the chock 20 at its 5-inch high upper corner, as shown in FIG. 10. At this wheel radius limit, the contact force is at 45 degrees from the vertical such that a friction coefficient of one is required to prevent the chock from slipping anteriorly following contact (assuming a massless chock). For a radius beyond 16.8 inches, the initial contact angle γ decreases, thereby relaxing the requirement on the ground surface friction coefficient to prevent failure mode B. Wheels with a radius of 10.26 inches to 16.8 inches make direct contact with the 45-degree surface. Any wheel with a radius lower or equal to 10.26 inches makes initial contact with the chock at its 3-inch upper corner and further rolls on the 45-degree surface upon wheel forward motion. Hence, before such wheels reach the 45-degree surface, the likelihood of experiencing failure mode B is higher since a much higher coefficient of friction is needed to avoid slipping because of a too high γ angle.

Mode C: Pivoting about Inferior Anterior Edge

Failure mode C may take place when the direction of contact force N passes anteriorly to the inferior anterior edge point O of the chock 20, as shown in FIG. 4, while fulfilling Eq. (8). In such situation, contact force N produces a positive moment about point O, thereby inducing a rotation of the chock about point O, as shown in FIG. 6 item (c). In the case of the standard aeronautical chock 20 (FIG. 10), by enforcing a wheel radius of 5 inches minimum and given the specific chock profile, the contact force N line of action is always posterior to the inferior anterior edge, thereby preventing the occurrence of failure mode C. The standard SAE J348, by enforcing a minimum chock length, most likely attempts to address this issue. However, constraints indicated on the chock geometry may not be sufficient to prevent failure mode C.

Mode D: Grooving

If modes A, B and C are prevented, a fourth failure mode D may still occur where the chock 20 tilts anteriorly and starts grooving the ground surface 30 by the chock inferior anterior edge. Eventually, the chock fails under modes A, B, or C if grooving becomes more pronounced and the chock orientation changes significantly upon wheel forward motion. Mode D can be prevented, using a ground surface with sufficient surface stiffness.

Mode E: Collapsing

If the chock geometrical profile is well controlled and the ground surface is sufficiently stiff, mode E may occur if chock stiffness is not sufficient to maintain its geometry upon tire loading. Although the failure ends up as a roll-over (mode A), slipping on ground (mode B) or pivoting failure (mode C), its origin is the collapse of the chock 20 itself. Even a partial collapsing of the chock 20 may be detrimental since it changes the chock profile, and most likely, the height of the initial contact point P.

Mode F: Expulsion

Expulsion of the chock 20 upon compression by the tire is a failure mode F that must be considered with care. When mode F occurs, the chock may become a projectile that could be lethal for people standing in the surroundings. Indeed, a significant amount of energy is stored in the chock/tire/suspension system when compressed. Assuming that the wheel 22 is freely rotating, the chock 20 may be expulsed laterally, anteriorly or posteriorly since the wheel brakes are often not in action when the chock is needed. Therefore, the chock 20 must be designed in such a way that any infinite rotation of the wheel 22 or deformation of the tire upon contact further increases the chock-tire system elastic potential energy. Incidentally, the engine run chock 22a tested by the U.S. Air Force got expulsed at one point, explaining why they did not pursue its use.

In summary, the specific failure mode that occurs for a given chock 20 depends on a number of variables and its application. For trailer applications, all failure modes can be observed when a trailer leaves a dock under the pulling action of a truck. Modes A and B can potentially be observed when a forklift brakes on the trailer platform. Considering the weight of a forklift, such action may produce a significant force perturbation on the trailer. Simple calculations suggest, however, that this situation should not induce a forward motion of the trailer when the ground surface has a reasonable friction coefficient. Yet, it may occur for snowy or icy surfaces. Modes A and B could also be observed when the ground surface is not leveled. In such case, any inclination of the ground away from the dock directly reduces angle $\phi$ in Eq. (1).

The initial velocity of the vehicle prior to contact with the chock 20 must also be taken into account when evaluating a chock efficiency. For instance, in a study on the stabilization of a fire truck on an asphalt surface using plastic or aluminum chocks, the fire truck, on releasing the brakes with the chock initially in contact with the wheel, did not move forward when the truck was at rest on a 3-degree slope, but it did by 1 to 3 inches on a 30-degree slope for the aluminum chocks, until the chock teeth grooved the asphalt. Plastic chocks were not capable of stopping the vehicle due to the occurrence of failure mode B. When the chock was located about 2 inches in front of the wheel to simulate a rolling start, the truck brakes were released, and the aluminum chock moved by 10 to 15 inches before the truck came to a stop. Plastic chocks were obviously not tested under this condition since they had failed the static test. These observations, all together, demonstrate that ground friction behaviour is a complex phenomenon involved in determining chock performance. Indeed, it appears that for aluminum chocks, initial contact with the chock at non-zero velocity first induces failure mode B instead of mode A, as one would expect from observations made for a close to zero contact velocity. Alternatively, mode A might first occur, but upon initial rolling-over, mode B starts off. This peculiar behaviour is either due to a contact force orientation that gets beyond non-slipping requirements indicated by Eq. (8) or to a ground friction coefficient that momentarily decreases due to grooving or temperature increase of the chock during slipping.

A grounded chock 20 obviously provides a better solution to prevent most of the failure modes. However, environmental conditions may not allow chock grounding. In such situation, a failure would most likely occur and, from a safety standpoint, it is advisable to design a wheel chock 20 so that the specific failure that occurs is well controlled and, hopefully, it minimizes adverse events.

For trailers immobilized at a dock, a phenomenon called "dock-walking" may occur when a forklift gets on and off the trailer platform. This movement compresses the rear suspension that may make the trailer move forward at each forklift pass over the suspension. A wheel chock 20 that is not grounded is not able to prevent this problem since it would experience failure mode B.

Wheel Chock Geometry: Quasi-Static Analysis

Analysis of the various chock failure modes clearly indicates that a grounded wheel chock 20 is to be preferred in terms of restraining efficiency. Yet, grounded chocks can still fail under different modes. Mode A, rolling-over, can be prevented by having a vertical contact plane with a height at least equal to the wheel radius. By definition, mode B cannot occur for a grounded chock as long as the horizontal mechanical resistance of the grounding fixtures are strong enough to compensate for the traction force T. Mode C, pivoting about the anterior edge, requires that the grounding fixtures also have a high resistance to vertical pulling. Thus, the fixtures are most likely capable of avoiding mode D, grooving on the ground surface. Mode E, collapsing, requires a sufficient stiffness from the chock's structural components, which, at the same time, also addresses mode F since chock dimensional stability plays a significant role in preventing its expulsion.

In many situations, however, ungrounded chocks are required. Fundamentally, the restraining force of an ungrounded chock relies both on the chock profile maximal tangent and the actual friction coefficient at the interface between the chock 20 and the ground 30. As such, the maximal restraining force of an ungrounded chock 20 on a given ground surface 30 is equivalent to the friction force obtained by a locked-up wheel 22 slipping on the surface 30, assuming a massless chock and the same vertical load (ideally, the total axle load to maximize restraining force). In practice, the chock's mass is much smaller than the load applied on a wheel 22 and a chock 20 can therefore be considered massless for design purposes, yet a minimal mass is required to prevent undesired self-motion of the chock upon wind blows, when it is laying on the ground.

The description of failure modes hereinabove highlighted the fact that a chock can fail under different modes that depend on the wheel radius and the ground-chock interface friction properties. Moreover, a number of failure modes do not ensure that the chock's maximum restraining force is achieved. For instance, a chock 20 can fail under mode B and offers a negligible restraining force if the initial contact point height is too high on the chock. From a safety standpoint, it is advisable for a chock to fail only when the maximum restraining force is reached (i.e. with wheel completely or entirely supported by the chock) and, ideally, always under a single well-controlled mode (or sequentially under the same modes) independently of the wheel radius and the ground-chock interface friction properties.

Given a specific range of friction coefficient $\mu$ that may occur between the chock bottom surface 46 and the ground surface 30, and specific range of wheel radii r that may engage a given chock, the chock profile 42 of a chock device 40 in accordance with embodiment of the present invention can be obtained as follows, assuming a quasi-static analysis. The chock profile 42 defines a top surface 44 thereof extending generally over a bottom surface 46 typically in contact with the ground surface 30. The ground surface 30 may be, without being limited to, a concrete of asphalt surface, grass, snow surface, or a railway, contaminated or not. The bottom surface 46 typically extends between a posterior first end 48 and an anterior second end 50. To start with, the wheel 22 of radius r (as shown in FIG. 11 (*a*) in contact with the ground 30, at point C, rolls toward the chock 40 and contacts the chock 40 at a first contact point P1 located on first slope segment S1 of a contact surface 52, as shown in FIG. 11 (*b*), adjacent to the posterior (first) end 48 of the chock 40. Typically, chocks may be used with a range of wheel diameters ranging from $r_{min}$ to $r_{max}$. For a wheel radius of $r_{min}$, first contact is made onto segment S1 of contact surface 52 at point P1 located adjacent the posterior first end 48, shown in FIG. 11 (*c*). Whatever the wheel diameter is, the planar surface S1 is set at a first angle $\phi_1 = \gamma_1$ where $\gamma_1$ is defined in such a way to fulfill Eq. (8), i.e. tan $\gamma_1 < \mu_{min}$ (assuming a massless chock) avoiding slipping of the unloaded chock 40 for the minimal friction coefficient $\mu_{min}$ that may be expected from the ground surface 30. The height of first contact point P1 typically varies as a function of wheel diameter while the angle $\gamma_1$ remains constant as observed with $r_{max}$ in FIG. 11 (*b*) and $r_{min}$ in FIG. 11 (*c*). The height $h_R$ adjacent the posterior end 48 is typically defined as a function of the minimal wheel radius $r_{min}$ to ensure that the wheel 22 of minimal radius $r_{min}$ can also make contact tangentially with the chock 40 at first contact. To fulfill this constraint, based on simple geometric calculations, one can show that the maximal height $h_{Rmax}$ adjacent the posterior end 48 is given by:

$$h_{Rmax} = r_{min}(1 - \cos\gamma_1) = r_{min}\left(1 - \frac{1}{\sqrt{1 + \mu_{min}^2}}\right) \quad (9)$$

Since the wheel always makes a tangential contact with the chock 40 and because angle $\phi_1$ is always smaller than a tan ($\mu_{min}$), the chock 40 cannot slide on the ground 30 at first contact with the wheel 22. By increasing traction force T, the wheel 22 progressively transfers its load from point C to point P1. Once the traction force exceeds $T_{max}$ defined by Eq. (1), the wheel 22 begins to roll on the planar first surface segment S1 from first contact point P1 to intermediate contact point P1' until making contact on the chock 40 onto the second segment S2 of the contact surface 52, as shown in FIG. 11 (*d*). For a wheel 22 of maximal radius $r_{max}$, the contact onto segment S2 is made at second point of contact P2. Although the rolling distance until the wheel 22 contacts second segment S2 might be short (actually zero for infinitely rigid wheels, such as a steel wheel or the like), it remains essential to ensure that the full wheel axle load is transferred to the chock 40 before wheel contact occurs on second segment S2. By further increasing traction force on the axle 26, the normal force on second segment S2 increases and that at first point P1 decreases. In order to take advantage of the full restraining force capacity of the chock, the minimum angle of the second planar surface segment S2 relative to ground ($\phi_2$) can be defined with Eq. (8) using a value of friction coefficient slightly larger than $\mu_{max}$, i.e. tan $\phi_2 > \mu_{max}$.

FIG. 12 shows free body diagrams of the wheel 22 and chock 20 assembly for different values of $\gamma$ and $\mu$. For $\mu \leq \mu_{max}$, the system remains in static equilibrium (FIG. 12 (*a*,*c*)) until the traction force reaches the maximum possible restraining force equal to $N_X^{max} = N_Y = \mu W$, since the axle load is fully supported by the chock 40, that is the wheel 22 being entirely supported by the chock 40. For higher traction forces $T > N_X^{max}$ (FIG. 11 (*b*,*d*)), failure mode B occurs, regardless of the value of $\mu$ because the ground-chock interface capacity is then exceeded. Failure mode A is prevented because the tangent of the second surface segment S2 is chosen sufficiently steep, i.e. tan $\phi_2 > \mu_{max}$, such that T cannot reach the value defined by Eq. (1). Failure mode C is avoided by choosing a chock's length long enough to have resultant force line of action (represented as a dashed line in FIG. 11 (*d*) and FIG. 12) extend posterior to point O, or by intersecting the bottom surface 46 between the first 48 and second 50 ends.

For a chock 40 that is not anchored on the ground, failure mode B is the safest mode to occur because the restraining force remains following failure. Failure under this mode also allows the ungrounded chock 40 to produce the maximum restraining force. From our point of view, failure mode B should be preferred over other modes. However, if the ground surface friction coefficient $\mu > \mu_{max}$, the restraining capacity at the ground becomes higher than the minimum force required for the wheel 22 to roll over the chock 40. Hence, if T becomes higher than $\mu_{max}W$, the chock 40 fails under mode A (rolling over the shock) instead of mode B (slipping on ground), because the orientation of the surface of the second surface segment S2 was set according to $\mu_{max}$, i.e. the second angle $\phi_2 = \gamma_2 > a \tan(\mu_{max})$. Consequently, it is suggested to increase planar surface S2 orientation in such a way to prevent chock's failure under mode A, and to take advantage of a friction coefficient greater than $\mu_{max}$, i.e. even if outside of the design requirements. However, increasing that angle increases chock's length to avoid failure mode C. This mode is very prone to instability and expulsion and it must absolutely be avoided. When outside of the design requirements, the occurrence of failure mode A is thus preferred for safety reasons and to limit chock overall dimensions.

The location of a planar surface of the second surface segment S2 is typically set as follows. The surface can be extended to intersect the bottom surface 46 of the chock 40 at point B, between first 48 and second 50 ends, as illustrated by the dashed line in FIG. 11 (*e*). The distance between point B and point R (perpendicular projection of point P1 on the bottom surface 46) can be set such that a single contact is initially made by the wheel 22 on the chock first segment S1, specifically at first contact point P1, located at the posterior end 48 for a lowest wheel radius ($r_{min}$), and that a sufficient rolling distance A-A', at the wheel axle 26, (or P1-P1' at the wheel/chock contact point) is achieved on surface S1, for all wheel radii, to ensure complete axle load transfer on planar first surface segment S1 before contacting second surface segment S2. At this point, the wheel 22 is entirely supported by the chock 40. For an infinitely rigid wheel 22, the rolling distance is infinitely small. For a deformable wheel 22, however, it is not zero. In fact, the contact of a tire with a supporting surface is not a single point contact but rather a definite contact zone equivalent to the wheel sustentation area (sustentation length by the width of the tire tread). Therefore, a significant portion of the sustentation area may be in contact with first segment S1 before the wheel 22 is entirely supported by the chock. As an example, for a nominal wheel radius of 22.5 inches (about 57 cm) on a fire truck of about 42 000 lbs (about 18 600 kg), the sustentation base length on a concrete surface was found to be in the order of 8 inches (about 20 cm), both for the rear and front tires. The magnitude of the required rolling distance A-A' actually depends on the wheel axle load, tire pressure, stiffness, radius, and on the chock profile, in particular $\phi_1$ and $h_R$. Commonly encountered values of these parameters suggest that the minimum rolling length should be at least 30% of the wheel sustentation length. More realistically, it should be between 40-60% of the wheel sustentation length.

For a given rolling distance A-A', positioning of second surface segment S2 by setting segment length BR as:

$$BR_{min} = \qquad (10)$$
$$r_{max}\left(\frac{\mu_{max}}{\sqrt{1+\mu_{max}^2}} - \frac{\mu_{min}}{\sqrt{1+\mu_{min}^2}} - \frac{1}{\mu_{max}} + \frac{1}{\mu_{max}\sqrt{1+\mu_{max}^2}}\right) +$$
$$AA'\left(\frac{1}{\sqrt{1+\mu_{min}^2}} - \frac{\mu_{min}}{\mu_{max}}\frac{1}{\sqrt{1+\mu_{min}^2}}\right) +$$
$$(r_{max} - r_{min})\left(\frac{1 - 1/\sqrt{1+\mu_{min}^2}}{\mu_{min}}\right)$$

The total base length (segment OR), or bottom surface length, hence becomes:

$$OR = r_{max}\left(\mu_{max} - \frac{\mu_{min}}{\sqrt{1+\mu_{min}^2}}\right) + \qquad (11)$$
$$AA' \frac{1}{\sqrt{1+\mu_{min}^2}}(\mu_{min}\mu_{max} + 1) + (r_{max} - r_{min})\left(\frac{1 - 1/\sqrt{1+\mu_{min}^2}}{\mu_{min}}\right)$$

while the overall height $h_T$ of the chock 40 is given by:

$$h_T = r_{max}\left(1 - \frac{1}{\sqrt{1+\mu_{max}^2}}\right) + AA'\frac{\mu_{min}}{\sqrt{1+\mu_{min}^2}} \qquad (12)$$

The possible occurrence of failure mode A (when $\mu > \mu_{max}$ and $T > \mu \cdot W$) requires to take failure mode F (Expulsion) into account while the wheel 22 is rolling on the anterior portion 54 of the top surface 44 anterior to the second point P2, such as surface segments S3 and S4. Accordingly, the angle of the tangent of any point of the anterior portion 54 of the top surface 44 relative to the ground surface 30 should always be less than or equal to the angle of the tangent at the second point (P2) relative to the ground surface 30 ($\phi_3$, $\phi_4 \le \phi_2$) and, specifically for the embodiment of FIG. 11, opposite thereto in orientation. By choosing $\phi_4 = \phi_2$, one ensures that the maximal restraining force capacity is available at the ground surface regardless of the position of the wheel 22 on the chock 40, thereby limiting the possible occurrence of failure mode F. Accordingly, as shown in FIG. 11 (f), the anterior section of the chock (delimited by surface segments S2, S3, S4 and segment OB) is typically symmetric about its midpoint vertical axis. Length of surface segment S3 is constrained by other variables and its minimal value is typically given by:

$$S3 = \left(L - BR - \frac{2h_T}{\mu_{max}}\right) \qquad (13)$$

Wheel Chock Geometry: Dynamic Analysis

The previous quasi-static analysis resulted in a simple two-planes chock profile that fundamentally operates by a progressive axle load transfer from first point P1 to intermediate point P1', and further to second segment S2. At the same time, contact force N orientation changes progressively from $\gamma_1$ to $\gamma_2$. From a quasi-static standpoint, the profile between points P1 and P2 is typically arbitrarily selected as long as it does not geometrically interfere with the wheel circumference. However, from a kinematic standpoint, if the chock 40 and the wheel 22 are assumed to be infinitely stiff and segments S1 and S2 are assumed planar, the load transfer from first segment S1 to second segment S2 makes the axle velocity suddenly change direction, resulting in a jerk. This rapid change in axle velocity induces a momentary high contact force on the chock 40 (at point P2 for a wheel 22 with the maximum radius) that could initiate failure mode B due to a rapid change in interactive forces at the wheel-ground interface. Fortunately, the wheel 22 and the suspension are not infinitely stiff such that the change in velocity is not so abrupt. Nevertheless, the chock design typically tries to circumvent this problem by having a chock's profile with a slope progressively changing from the first angle ($\phi_1$) of surface segment S1 to the second angle ($\phi_2$) of segment S2, while maintaining at most two simultaneous points of contact between the wheel 22 and the chock 40. A chock's concave curved circular profile is one option that is often implemented in commercial chocks. This option, as shown in FIG. 14, could be acceptable as long as the chock's radius of curvature is larger than the radii of the wheels that make contact with the chock, thereby controlling contact point(s) with the chock at all time. An alternative is to have a chock's profile based on an Euler spiral or clothoid function. This function is such that its curvature changes linearly with arc-length distance. It is often used for the design of highways or railways segments. It is of interest because it minimizes the jerk on the vehicle and, thereby, the interacting forces with ground 30. Segment S2 could even have a profile of a piece-wise (plurality of successive, in an end-to-end relationship relative to one another) planar, spline or clothoid surfaces.

Minimizing the wheel jerk when contacting the chock 40 might be highly beneficial to prevent failure mode B as the wheel 22 makes initial contact with the chock 40. As a matter of fact, if the profile curvature changes progressively, the rate of change in chock contact force magnitude and direction is thus decreased, thereby minimizing the rate of change of relative micromotions that occur at the chock-ground interface, generated by chock structure deformations. These micromotions could actually influence the stick-slip dynamics that occurs at the chock-ground interface during loading, possibly reducing the effective friction coefficient, and hence initiating mode B earlier than expected. In fact, Eq. (8) is a highly simplified model of friction that does not account for known observations in stick-slip friction phenomena.

The jerk was thus compared for a wheel 22 contacting a circular versus a clothoid chock profile. It was estimated by modelling a vehicle, as a first approximation, as a single mass M (5000 kg) with an initial velocity $v_0$, supported by a spring suspension $K_S$ connected to a wheel axle of mass $m_w$ (200 kg) separated from the chock 40 by a linear spring of stiffness $K_w$ to simulate tire impedance, as shown in FIG. 13. A Simulink™ model (Mathworks, Waltham, Mass., USA) of the system was constructed and the time varying contact force with the chock 40 was simulated as the wheel 40 is rolling on the chock's second surface segment S2 at an initial velocity of 0.5 m/s when x=0. The suspension and tire stiffnesses were both chosen as 1E6 N/m. The circular chock profile had a radius of 23.6 in (1.05*22.5) and a single clothoid was created with a 11.3-degree initial slope, up to 51.3 degrees (for a total of 40 degrees) at a given height, in such a way that no geometrical interference occurs as the wheel 22 rolls on the second segment S2 of the contact surface 52. To that end, a mathematical approach and a numerical approximation of the profile was computed with Matlab™ (Mathworks, Waltham, Mass., UJSA). The resulting profiles are shown in FIG. 14 along with time variation of a number of relevant variables when the wheel 22 rolls along the chock second segment S2 at a constant forward speed. As expected, the clothoid profile (solid line curves) shows a much smaller rate of change in contact force orientation and magnitude compared to the circular profile (stippled line curves), in particular, at initial contact and for a long time period thereafter. It is even more obvious when looking at the rate of change of the horizontal component of contact force N. From our point of view, this is a positive result since dynamic loading is reduced when the wheel 22 is actually engaging on the clothoid chock, thereby, ensuring a better control on ground friction properties and contact force orientation on the chock 40 until the wheel 22 is completely supported by the chock 40. A clothoid profile is preferred over a circular profile for designing a chock 40 if sufficient space is available, and if rolling distance before getting to a stop is not critical.

Alternatively, a shorter chock length with a curved profile can be obtained by a piece-wise planar, spline or clothoid surfaces assembly.

Wheel Chock Embodiments

Specialty covering pads 60 to control bottom surface friction with ground surface 30 may be releasably mounted on (inserted in, bonded, secured, etc.) on the chock bottom surface 46, as shown in FIG. 16. These pads 60 may include mechanical means 62 to increase gripping mechanical interaction with the ground surface 30 if needed, such as metal studs or pins or the like. The particular pad dimensions and pattern illustrated in FIG. 16 are not restrictive and may be adapted to control chock motion upon wheel engagement.

In another embodiment, segment S2 is made from a slippery surface with a friction coefficient equal to or smaller than 0.5. The purpose of making the surface slippery is to provide additional restraining performance if the chock is used with a powered wheel 22. The wheel thus has more difficulty rolling up the chock. For safety purposes however, segments S3 and S4 may have non-slippery surfaces to ensure appropriate stability of the chock when the wheel 11 rolls over the chock contact surface 52. Moreover, segment S1 may not be made slippery to allow the wheel to stabilize at its lower position on segment S1.

In another embodiment, as shown in FIG. 17, segment S2 is made from an assembly of parallel rolling cylinders or rollers 66 to further reduce the ability of a powered wheel to roll up the chock 40, the assembly obviously configured to follow the desired profile of the chock second segment S2. The rollers 66 are typically freely rotatably mounted onto the chock 40 in a parallel relationship relative to one another.

As shown in FIG. 18, the present invention also refers to a kit for stopping the wheel 22 of a vehicle from rolling on the ground surface 30 and including at least two wheel chock devices 40. Accordingly, bi-directional stabilization of the vehicle may be achieved by using two opposite chocks 40, as often used in many applications, as illustrated in FIG. 18. The present invention has a main advantage over other existing chocks 20 whereas a single chock 40 is initially installed on one side of the wheel 22 and the vehicle is moved enough to entirely engage the wheel 22 on the chock contact surface 52, either on segment S1 or S2. Brakes are then applied on the vehicle wheels, such that the second chock 40 may be inserted under the same wheel 22, opposite to the first chock 40. Mechanicals links or connecting member 70, such as transverse pins 72, bolts, hooks, cables or the like may then be used to releasably interconnect the two chocks 40 and maintain a relative distance between each other once the brakes are removed from the vehicle. In such configuration, the chock relative distance may be controlled to determine the nominal position of the wheel 22 at rest over either segment(s) S1 and/or S2 of the chocks 40. By doing so, one can better control vehicle motion upon external force perturbations.

Without a dual configuration, the wheel could stand off segment S1, contacting the ground, thereby requiring a minimum rolling distance AA' to increase the maximal restraining force of the chock 40. Such movement may not be desired in certain applications, such as at docking stations with trailers.

In a dual configuration, if the wheel brakes are active, the chock 40 is still functional, as opposed to most chocks 20 that cannot provide much restraining force since mode B (anterior slipping) is quickly initiated as the wheel makes contact with the chock 40.

Although not illustrated, in another embodiment, the dual configuration may be such that the wheel 22 engages the first chock 40 that is permanently anchored on the ground by mechanical means (not shown) such as bolts, or the chock may be an integral part (not shown) of the ground surface.

In another embodiment, the segment S1 of both chocks 40 may, at least partially, extend into one another to ensure that the wheel 22 is entirely supported by the chocks 40 when at rest, as shown in FIG. 18.

It is obvious that most wheel tires are not perfectly circular, being often ellipsoidal in shape. Adaptation of the various design equations may therefore be necessary to take such small variations into account. Empirically, such variations can be considered by changing the design ranges for wheel radii and chock-ground friction coefficients.

Similarly, use of the chock 40 on sloped ground surfaces may be taken into account by a corresponding change in the range for the chock-ground friction coefficients.

Finally, it is obvious that the stiffness of the chock 40 is a critical parameter that needs to be well controlled to ensure maximal chock performance. Ground stiffness is also critical in the same regard.

Wheel Chock Design Constraints

Most national transportation standards indicate the need to use wheel chocks for securing heavy vehicles at rest. It is however noticed that chocks should not be used in place of wheel brakes, whenever possible. The SAE J348 standard stipulates that a single chock should be able to secure a vehicle for a ground inclination of up to 16.7 degrees or 30% for a vehicle with a 36,287 kg mass. For fire truck applications, the NFPA 1901 of the National Fire Protection Association stipulates that a single chock should have the ability to secure the truck for a slope of up to 10%. By enforcing the use of two chocks when securing a fire truck, they suggest a performance similar to the SAE J348.

Among the existing standards related to wheel chocks, the SAE J348 standard is one of the few that suggest a number of specific design parameters related to wheel chocks. Unfortunately, the rationale behind some of the proposed parameter values is not clearly stated in the standard. For instance, the standard indicates or suggests the following criteria for the overall chock geometry.

A height that depends on wheel radius, as illustrated on the graph provided in the standard;

A length 1.73 times its height;

A minimum width of 75% of the tire thread surface width;
An overall angle between the chock base and the tire engaging face shall be between 35 and 45 degrees;
Along with design calculations limits that indicate a curvature of the contact surface between the wheel and the chock as close as possible to the tire curvature.

It also includes a chock resistance compression test of 14,000 kg, where the chock integrity must be maintained after compression, and a design calculation performance restraining test, equivalent to a 30% incline. The methodology proposed for conducting the restraining test is not clearly indicated however. For instance, it is not stated on what surface the chock must be tested if it is ungrounded. Based on our understanding of the SAE J348 chock geometry requirements, they assumed a friction coefficient in the order of 0.7-1.0 for achieving the required performance.

The previous sections clearly demonstrated the need to have good control over the chock's geometric profile upon compression. As such, the SAE J348 standard compression test is not sufficient to predict chock's performance under load. The standard should, instead, prescribe a maximum deflection upon compression. As a first approximation, the chock should have a compressive stiffness in the order of 10E6 N/m, equal to about ten times the stiffness of a tire or the trailer suspension.

As far as the restraining test proposed is concerned, immobilizing a vehicle on a 30% incline has an impact on the amount of contact force to be transferred to the chock in order to successfully complete the test. Indeed, a chock can stabilize a vehicle in such condition if the work done by the friction force on the ground is higher than the work done by the gravity. This constraint can be expressed as:

$$\mu N_y l \geq m_v g l \sin \phi$$

or simply:

$$N_y \geq \frac{\sin\phi}{\mu} m_v g. \quad (14)$$

where l is the sliding distance of the chock on the ground surface, $m_v$ is the vehicle mass, and $N_y$ is the component of the wheel-chock contact force perpendicular to ground. A 30% incline results in a contact force $N_y$ respectively equal to 30% to 40% of the vehicle load for friction coefficients varying from 1.0 to 0.7. If the chocked wheel axle load is assumed in the order of 25% of the vehicle mass, the constraint is physically impossible to realize. It becomes possible for 10-degree slopes i.e. 18% slopes maximum, as long as the wheel axle load is completely transferred to the chock. If the axle wheel load is not completely supported by the chock, the maximum slope for vehicle stability is hence reduced.

Other standards exist regarding wheel chocks. The standard SAE AIR3905:2002 provides a list of considerations for the design of wheel chocks for aircraft applications. A minimum mass is suggested to prevent chock movement due to air blows from wind or aircraft turbines. Directive A-A52475A:1993 provides a detailed design of desired wheel chocks, indicating a contact surface curvature equivalent to the mean of the radii of existing tires on the market, and overall dimensions that depend of chock classification. Indeed, they classified chocks based on their materials and their dimensions. Type I chocks are made of limited hard wood where each layer is 32-mm thick at minimum. Type II chocks are made of elastomers or laminated hard wood, each layer being 32-mm thick at minimum. Finally, Type III chocks are made out of non-ferrous metals moulded or extruded, such as aluminum to avoid sparks when scratching on the ground surface. Finally, the military standard MIL-PRF-32058 prescribes a chock mass of maximum 35 lbs or 16 kg to facilitate hand manipulations. Material to be used should be soft wood unless accepted by military officials. Resistance to compression should be at least 4.3 MPa and chocks should be resistant to UV exposure and 100% humidity conditions. Overall dimensions are also prescribed.

Based on all the above, a non-exhaustive list of constraints or parameters for the wheel chock 40 of the present invention is provided in Table 1, aside from the chock ideal profile described hereinabove.

Although wheel chocks have been in use for quite a long time, there is very little information on what makes a wheel chock reliable and how to improve its efficiency by design. On the one hand, this is surprising given their impact on vehicle safety in the transportation industry. On the other hand, friction is a complex physical phenomenon that is still under active studies. Existing standards do provide useful information in terms of ergonomics and types of materials to be used for their fabrication, but they either give very limited information concerning their profiles, or alternatively, they enforce a specific profile for a specific application, such as for aeronautic chocks.

Yet, whatever the chock design is, it is important to remember that when a chock is not anchored on ground, its restraining capacity never exceeds the friction resistance at the interface between the chock 40 and the ground 30, the maximum being when the wheel axle load is completely transferred to the chock. Hence, if there is no special mechanical feature to improve chock anti-slipping resistance on the ground surface, it is highly improbable that a chock restraining capacity to slipping exceeds that of a locked wheel. In other words, an ungrounded chock without any special anti-slipping mechanical features is no better than putting on the brakes on a single wheel. This is why wheel chocks are usually used as a safety device to stabilize a vehicle in case of brake failure.

TABLE 1

List of Design Constraints for the Wheel Chock of the Present Invention

| Type | Description |
| --- | --- |
| Environmental | Maintain efficiency over a large range of temperatures (−60° C. to +80° C.) |
| | Maintain efficiency and integrity over wet, snowy, icy, sandy or salty ground surfaces |
| | Does not float |
| | Moisture resistant |
| | UV resistant |
| | Resistant to 100% humidity |
| Ergonomics and Safety | Color compatible with regulations in practice and for easy recovery |
| | Limited mass* |
| | Rounded edges |
| | Visibility (day and night) |
| | Include a chain or cable for securing the chock to limit chock movement upon expulsion, thefts or loss in snow banks |
| | Does not produce sparks when scratching the ground surface |
| | Can be inspected within a limited time frame (suggestion: 5 minutes) |

TABLE 1-continued

List of Design Constraints for the Wheel
Chock of the Present Invention

| Type | Description |
|---|---|
| Dimensions and geometric profile | To be defined and most likely dependent on wheel radius |
| Material | Resist to transmission or brake oils, grease, water, fuel, etc.<br>Chock resistant (suggestion: drop test of three meters, to ensure integrity following falls from dock or trailer platform)<br>Compression test of about 14,000 kg<br>Stiffness test with a threshold of about 10E6 N/m** |

*Standard ISO 11228-1: 2003 suggests a maximum value of 25 kg. A value of 15 kg (identical military standard MIL-PRF-32058) would be preferable because chocks are often hand manipulated, but they need to remain in place by themselves when exposed to wind blows.
**Given that a tire stiffness is about 1E6 N/m, and a truck suspension is about 1.2E6 N/m), ten times this value appears to be a reasonable threshold value.

Depending on the domain of application, the chock operating conditions may vary significantly. For fire trucks and trains for instance, they are used to counteract gravitational forces on the vehicle on tilted grounds. For trailers located at docking stations, its use is more extended, including impeding departure of the tractor from the dock. The inventors believe that the failure mode that should occur when the chock is maximally loaded is slipping on the ground surface (mode B), a mode that we consider to be safer than rolling over, pivoting or potential expulsions. In such case, chock resistance to forward motion remains, even when the vehicle attempts to leave without removing the chock. The increased resistance to moving may then be sufficient to warn the driver that a technical problem is on-going.

The ideal chock profile of the present invention was determined based on a conservative approach, taking advantage of the fact that contact force orientation with the chock 40 is known in the case of a tangential contact with a planar surface 52. A more aggressive approach could be taken where chock's restraining capacity would rely on the contact of the wheel 22 with the chock 40 at non-planar surfaces and, at the limit, at a given point P located on segment S2. That way, a smaller (shorter in length) chock may be created, but its robustness might be questionable given that it would rely on a complex mechanical interaction that depends on numerous physical parameters (wheel mechanical impedance, load sharing ratio across two contact points, ground properties, ground friction properties, etc.). If the wheel surface has an isotropic stiffness shape or if the tire apparent stiffness matrix has a principal axis along the approaching velocity of the tire to point P (e.g. perpendicular to segment CP, as shown in FIG. 3, for a rigid wheel surface), then contact force with the chock would be along that velocity vector, a less conservative situation than assuming infinite stiffness of the wheel. In practice, this is most unlikely and therefore, advanced hyperelastic modelling or experimental tests are required to figure out the contact force orientation.

Chock standards implicitly suggest that a wheel chock should favor a maximum contact with the wheel. By extension, one may interpret this statement as a suggestion to have a chock's contact surface curvature equal to that of the wheel, as suggested in some existing patents. Both the quasi-static and dynamic analyses presented in this paper show that this would not be a good approach for designing a chock since contact point with the chock is not well controlled and may initiate failure mode B.

The chock profile described hereinabove is based on simplified friction models that do not account for more advanced knowledge on the physics of friction. As such, the particular profile to get from surface S1 to S2 is not a constraint, as long as there is no interference with the wheel surface. We believe that more advanced friction models may add more constraints. For instance, we prefer the chock profile to be a clothoid profile to minimize the rate of change of the contact force with the chock, potentially leading to a better control of friction properties. Indeed, dynamic loading of the chock-ground interface may momentarily reduce ground friction coefficient, from static to dynamic, due to micromotions that occur at the ground contact interface. Given the complexity of friction behaviour under dynamic loading, if the micromotion minimizing principle appears promising, further modelling efforts may be beneficial for determining a more efficient chock under dynamic loading.

SAE standard J348 remains the current reference in chock design. The above paragraphs have pointed out three important weaknesses in the standard that should be addressed in the future. Firstly, the standard specifies chock's heights that can easily induce failure mode B or C before any significant restraining force is produced, as shown in FIG. 9. Secondly, the technical indications do not ensure that a maximal restraining force is achieved by taking advantage of the full ground friction resistance. Indeed, nowhere in the standard it is indicated that the axle load should be completely transferred to the chock before any failure mode occurs. Thirdly, the SAE standard more or less assumes that the ground friction coefficient is in the order of 0.7 to 1.0 in order to stabilize the chock. Outside this range, the standard requirements on chock geometry may not be adequate anymore.

Figure 2:
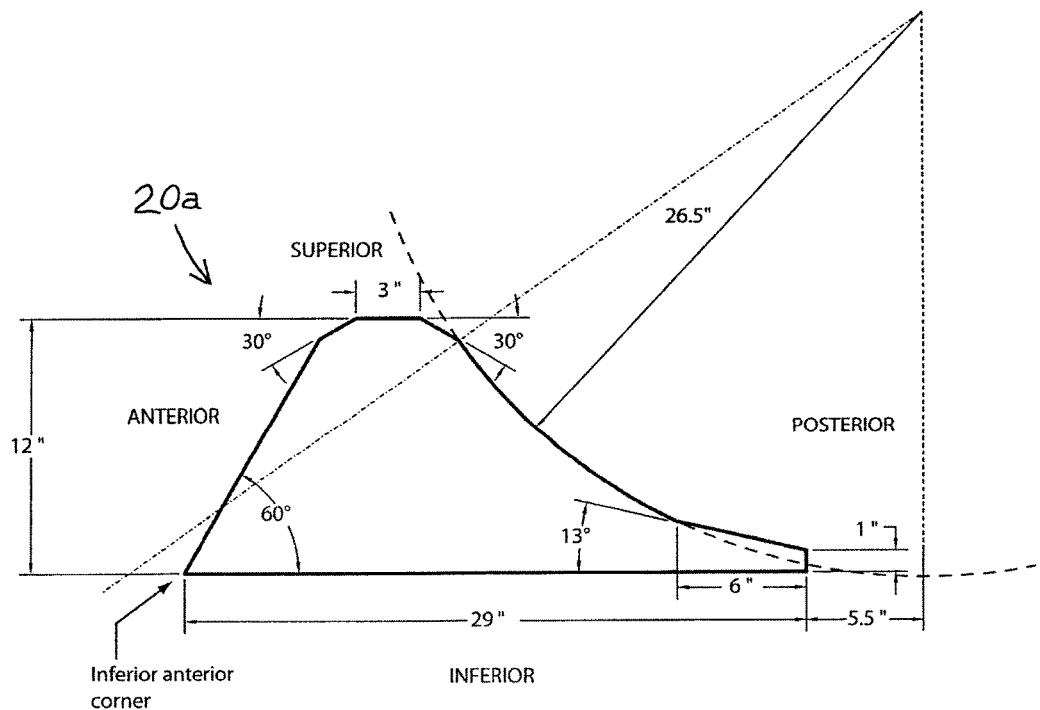
FIG. 2 is a profile view of an example of an engine run chock adapted from the prior art.

The 'engine run chock' 20a (FIG. 2) proposed by the U.S. Air Force did show a significant improvement in terms of restraining capacity, but it did not prevent expulsion or slipping on ground at low axle loads. Unfortunately, description of the detailed methodology employed in their study makes it difficult to understand the origin of the chock's weaknesses. The inventors believe that the chock 20a could have failed because of a too high first contact point or because tip over inferior anterior corner occurred and the chock's anterior surface was too steep to maintain its stability, resulting in failure mode F (expulsion).

The previous analyses assumed that the chocked wheel is unpowered. When used on powered wheels, the behaviour of the chock differs significantly. The tangential force produced by the wheel on the chock is detrimental because it contributes to raising the axle over the chock. If the chock contact surface S2 with the wheel is made slippery (by minimizing the coefficient of friction between the wheel and the contact surface 52), this issue can be mitigated up to a certain level.

A chock contributes to vehicle safety as long as it is actually used. Ease of manipulation and ergonomics aspects of a chock also play a role in this regard and they should be considered with care for the design of a chock. To that end, a non-exhaustive list of design constraints was established hereinabove. One of the most important point to remember is that variables that may affect chock's profile relative to ground must be well controlled, including chock and ground stiffness.

The present invention provides for design criteria to make a wheel chock 40 with improved restraining capacity and safety. Together with the vehicle, the ground 30 and the wheel 22, it constitutes a closed-loop mechanism that may experience several failure modes that were explained in details. Assuming infinite impedance of the wheel 22, chock 40 and ground 30 subsystems, a theoretical analysis showed that by proper design of the chock's geometrical profile and apparent stiffness, most failure modes may be avoided. At the end, when a sufficient traction is exerted on the axle 26, the safest design should allow for chock slipping on the ground surface 30, yet, not before axle load is completely supported by the chock 40. The wheel chock device 40 of the present invention proposes to enforce that particular failure mode, both for quasi-static conditions or dynamic vehicle motion. The chock 40 is designed in such a way to take full advantage of the friction resistance of the ground-chock interface. Dynamic simulations of a wheel contacting a chock demonstrated the potential advantage of using a clothoid geometrical profile to improve chock's restraining efficiency.

Although the present invention has been described with a certain degree of particularity, it is to be understood that the disclosure has been made by way of example only and that the present invention is not limited to the features of the embodiments described and illustrated herein, but includes all variations and modifications within the scope of the invention as hereinabove described and hereinafter claimed.

We claim:

1. A wheel chock device for stopping a wheel of a vehicle from rolling on a ground surface, said device comprising:
    a profile including a generally flat bottom surface for being in contact with a ground surface and extending between a first end and a second end; and
    a top surface for being in contact with the wheel, the top surface extending over the bottom surface, the top surface having a contact surface being able to support the wheel simultaneously over at most two points of contact thereof;
    the top surface including a first segment adjacent the first end and a second segment extending from the first segment and continuing the first segment away from the first end, the first and second segments defining a contact surface, the first segment being able to support the wheel and forming a generally flat first plane defining a first angle ($\phi_1$) relative to the bottom surface, a tangent of the first angle ($\phi_1$) being equal to or smaller than a minimum static coefficient of friction ($\mu_{min}$) between the bottom surface and the ground surface; and
    the first segment including a first contact point (P1) adjacent the first end and located at a first height ($h_R$) relative to the bottom surface to allow the wheel to engage the chock device, the first height ($h_R$), relative to a radius (r) of the wheel and the minimum static coefficient of friction ($\mu_{min}$), being obtained from the equation:

$$h_R < r\left(1 - \frac{1}{\sqrt{1+\mu_{min}^2}}\right)$$

the second segment including a second contact point (P2) being adjacent the second end and closer to the second end than the first contact point (P1) is; the second segment, at the second contact point (P2), defining a tangent having a second angle ($\phi_2$) relative to the bottom surface, a tangent of the second angle ($\phi$2) being equal to or smaller than a maximum static coefficient of friction ($\mu_{max}$) between the bottom surface and the ground surface, and larger than the tangent of the first angle ($\phi_1$);
    wherein a perpendicular projection of the first contact point (P1) on the bottom surface intersects the bottom surface at a first intersection (R) adjacent the first end, wherein the tangent of the second angle ($\phi_2$) intersects the bottom surface at a second intersection (B), and wherein the first segment has a rolling length (AA'), starting at the first point of contact (P1), ensuring the wheel to roll on the first segment and be entirely supported thereon before contacting the second segment;
    a minimum distance ($BR_{min}$) between the first and second intersections, relative to the radius (r) of the wheel, the rolling length (AA'), and both the minimum ($\mu_{min}$) and maximum ($\mu_{max}$) static coefficients of friction, is obtained by the equation:

$$BR_{min} = r\left(\frac{\mu_{max}}{\sqrt{1+\mu_{max}^2}} - \frac{\mu_{min}}{\sqrt{1+\mu_{min}^2}} - \frac{1}{\mu_{max}} + \frac{1}{\mu_{max}\sqrt{1+\mu_{max}^2}}\right) + AA'\left(\frac{1}{\sqrt{1+\mu_{min}^2}} - \frac{\mu_{min}}{\mu_{max}}\frac{1}{\sqrt{1+\mu_{min}^2}}\right).$$

2. The wheel chock device according to claim 1, wherein the second contact point (P2) is at a second height ($h_T$) relative to the bottom surface, the second height ($h_T$) being larger than the first height ($h_R$).

3. The wheel chock device according to claim 2, wherein a projection of the radius of the wheel extending through the second contact point (P2), when the wheel is in contact with the second contact point (P2), intersects the bottom surface adjacent the second end.

4. The wheel chock device according to claim 3, wherein the second height ($h_T$), relative to both the radius (r) of the wheel and the maximum static coefficient of friction ($\mu_{max}$), is obtained from the equation:

$$h_T = r\left(1 - \frac{1}{\sqrt{1+\mu_{max}^2}}\right).$$

5. The wheel chock device according to claim 3, wherein the wheel has a radius varying between a minimum radius ($r_{min}$) and a maximum radius ($r_{max}$), the second height ($h_T$), relative to both a maximum radius ($r_{max}$) of the wheel and the maximum static coefficient of friction ($\mu_{max}$), being obtained from the equation:

$$h_T = r_{max}\left(1 - \frac{1}{\sqrt{1+\mu_{max}^2}}\right).$$

6. The wheel chock device according to claim 3, wherein the second segment is a slippery surface having a coefficient of friction with the wheel equal to or smaller than 0.5.

7. The wheel chock device according to claim 6, wherein the slippery surface includes a plurality of rollers freely rotatably mounted onto the chock device and being in parallel relationship relative to one another.

8. The wheel chock device according to claim 2, wherein the top surface includes an anterior portion extending from the second contact point (P2) to the second end, the anterior portion always having a tangent having an angle relative to the bottom surface equal to or less than the second angle ($\phi_2$).

9. The wheel chock device according to claim 2, wherein the contact surface allows either only one point of contact at a time between said contact surface and the wheel or at most two points of contact therebetween with the second contact point (P2) being one of said at most two points of contact.

10. The wheel chock device according to claim 9, wherein the second segment includes a generally concave curved surface having a curvature radius larger than the radius (r) of the wheel.

11. The wheel chock device according to claim 10, wherein the concave curved surface has a clothoid or piece-wise clothoids profile starting with a slope equal to the first angle ($\phi_1$) adjacent the first segment and ending with a slope substantially equal to or larger than the second angle ($\phi_2$).

12. The wheel chock device according to claim 2, wherein the bottom surface includes a covering pad mounted thereon for contacting the ground surface.

13. The wheel chock device according to claim 12, wherein the covering pad is interchangeable.

14. The wheel chock device according to claim 1, wherein the second height ($h_T$), relative to the radius (r) of the wheel, both the minimum ($\mu_{min}$) and maximum ($\mu_{max}$) static coefficients of friction, and the rolling length (AA'), is obtained from the equation:

$$h_T = r\left(1 - \frac{1}{\sqrt{1+\mu_{max}^2}}\right) + AA'\frac{\mu_{min}}{\sqrt{1+\mu_{min}^2}}.$$

15. The wheel chock device according to claim 1, wherein the rolling length (AA') is larger than 30% of a sustentation length of the wheel, the sustentation length corresponding to a length of a deformed outer perimeter of the wheel being simultaneously in contact with a supporting surface.

16. The wheel chock device according to claim 15, wherein the rolling length (AA') is between 40% and 60% of the sustentation length of the wheel.

17. The wheel chock device according to claim 15, wherein the rolling length (AA') entirely supports the wheel.

18. The wheel chock device according to claim 1, wherein the wheel has a radius varying between a minimum radius ($r_{min}$) and a maximum radius ($r_{max}$), the first height ($h_R$), relative to both a minimum radius ($r_{min}$) and the minimum static coefficient of friction ($\mu_{min}$), being obtained from the equation:

$$h_R < r_{min}\left(1 - \frac{1}{\sqrt{1+\mu_{min}^2}}\right).$$

19. The wheel chock device according to claim 18, wherein the minimum distance ($BR_{min}$) between the first and second intersections, relative to both the minimum ($r_{min}$) and maximum ($r_{max}$) radii of the wheel, the rolling length (AA'), and both the minimum ($\mu_{min}$) and maximum ($\mu_{max}$) static coefficients of friction, is obtained by the equation:

$$BR_{min} = r_{max}\left(\frac{\mu_{max}}{\sqrt{1+\mu_{max}^2}} - \frac{\mu_{min}}{\sqrt{1+\mu_{min}^2}} - \frac{1}{\mu_{max}} + \frac{1}{\mu_{max}\sqrt{1+\mu_{max}^2}}\right) +$$
$$AA'\left(\frac{1}{\sqrt{1+\mu_{min}^2}} - \frac{\mu_{min}}{\mu_{max}}\frac{1}{\sqrt{1+\mu_{min}^2}}\right) +$$
$$(r_{max} - r_{min})\left(\frac{1 - 1/\sqrt{1+\mu_{min}^2}}{\mu_{min}}\right).$$

20. The wheel chock device according to claim 19, wherein the second predetermined height ($h_T$), relative to the maximum radius ($r_{max}$) of the wheel, both the minimum ($\mu_{min}$) and maximum ($\mu_{max}$) static coefficients of friction, and the rolling length (AA'), is obtained from the equation:

$$h_T = r_{max}\left(1 - \frac{1}{\sqrt{1+\mu_{max}^2}}\right) + AA'\frac{\mu_{min}}{\sqrt{1+\mu_{min}^2}}.$$

* * * * *